US011900496B2

(12) United States Patent
Kodesh et al.

(10) Patent No.: US 11,900,496 B2
(45) Date of Patent: Feb. 13, 2024

(54) SYSTEMS AND METHODS FOR TRANSPORT CANCELLATION USING DATA-DRIVEN MODELS

(71) Applicant: Lyft, Inc., San Francisco, CA (US)

(72) Inventors: Snir Kodesh, San Francisco, CA (US); Andrew Li, San Francisco, CA (US); Desmond Mawuko Torkornoo, Oakland, CA (US); Naomi Yarin, Oakland, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 17/886,831

(22) Filed: Aug. 12, 2022

(65) Prior Publication Data

US 2023/0023453 A1 Jan. 26, 2023

Related U.S. Application Data

(63) Continuation of application No. 16/027,208, filed on Jul. 3, 2018, now Pat. No. 11,449,962.

(51) Int. Cl.
*G06Q 50/30* (2012.01)
*G06N 20/00* (2019.01)

(52) U.S. Cl.
CPC .......... *G06Q 50/30* (2013.01); *G06N 20/00* (2019.01)

(58) Field of Classification Search
CPC .............................. G06Q 50/30; G06N 20/00
(Continued)

(56) References Cited

U.S. PATENT DOCUMENTS

2009/0326991 A1\* 12/2009 Wei ................. G06Q 10/08355
705/5
2015/0046083 A1 2/2015 Maitra et al.
(Continued)

FOREIGN PATENT DOCUMENTS

WO 2018195847 A1 11/2018
WO WO-2019174600 A1 \* 9/2019 ............. G06Q 10/02

OTHER PUBLICATIONS

Sun, H., Lv, Z., Li, J., Xu, Z., Sheng, Z., Ma, Z. Prediction of Cancellation Probability of Online Car-Hailing Orders Based on Multi-source Heterogeneous Data Fusion. Wireless Algorithms, Systems, and Applications. https://doi.org/10.1007/978-3-031-19214-2_14 (Year: 2022).\*

(Continued)

*Primary Examiner* — Shannon S Campbell
*Assistant Examiner* — Lisa Ma
(74) *Attorney, Agent, or Firm* — Greenberg Traurig, LLP

(57) ABSTRACT

Disclosed is a method for identifying, in real time, a transportation arrangement between a requestor and a provider that could benefit from a re-matching of the requestor with another provider. A system may match a provider with a requestor to complete a request for transportation from the requestor. The system may monitor a progress of the provider to a pickup location as specified in the request. Based on the monitored progress, the system may determine if the provider is making sufficient progress towards the pickup location. In some examples, the system may determine that the matching of the provider with the requestor is eligible for cancellation because the provider is not making sufficient progress towards the pickup location. The system may cancel the matching and then match another provider with the requestor to continue to make progress towards completing the transportation request.

20 Claims, 11 Drawing Sheets

(58) Field of Classification Search
USPC .......................................................... 705/13
See application file for complete search history.

(56) References Cited

U.S. PATENT DOCUMENTS

| | | |
|---|---|---|
| 2017/0200321 A1 | 7/2017 | Hummel et al. |
| 2017/0265040 A1 | 9/2017 | Friedlander et al. |
| 2018/0209803 A1 | 7/2018 | Rakah et al. |
| 2019/0101401 A1* | 4/2019 | Balva ..................... G06Q 50/30 |
| 2019/0164432 A1 | 5/2019 | Quitoriano et al. |
| 2021/0093074 A1* | 4/2021 | Williams ................. A45C 3/10 |
| 2021/0227049 A1* | 7/2021 | Demiralp ................ H04L 67/52 |
| 2022/0188958 A1* | 6/2022 | Vasudevan ......... G01C 21/3438 |

OTHER PUBLICATIONS

Sun, H., Lv, Z., Li, J., Xu, Z., & Sheng, Z. Will the Order Be Canceled? Order Cancellation Probability Prediction Based on Deep Residual Model. Transportation Research Record, 2677(6), 142-160. https://doi.org/10.1177/03611981221144279 (Year: 2023).*
Non Final Office Action received for U.S. Appl. No. 16/027,208 dated Sep. 29, 2021, 33 pages.
Notice of Allowance received for U.S. Appl. No. 16/027,208 dated May 12, 2022, 15 pages.
Wang et al., "When Will You Arrive? Estimating Travel Time Based on Deep Neural Networks". Proceedings of the AAAI Conference on Artificial Intelligence, 32(1). Retrieved from https://ojs.aaai.org/index.php/AAAI/article/view/11877 (Year: 2018), pp. 2500-2507.

* cited by examiner

SYSTEMS AND METHODS FOR TRANSPORT CANCELLATION USING DATA-DRIVEN MODELS

CROSS REFERENCE TO RELATED APPLICATION

This application is a continuation of and claims the benefit of U.S. application Ser. No. 16/027,208, filed 3 Jul. 2018, the disclosure of which is incorporated, in its entirely, by this reference.

BACKGROUND

Some transportation services may provide transportation on demand, helping those requesting transportation to connect with those who are willing to provide transportation as the needs arise. While these transportation services may help by facilitating agreements and/or communication between those requesting and those providing transportation, at times an arrangement for transportation may be disrupted due to a miscommunication or a change in circumstance.

SUMMARY

As will be described in greater detail below, the instant disclosure describes systems and methods for identifying transportation requests that may be eligible for cancellation (and, e.g., subsequent re-matching) using a data-driven model based on machine learning.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1A:
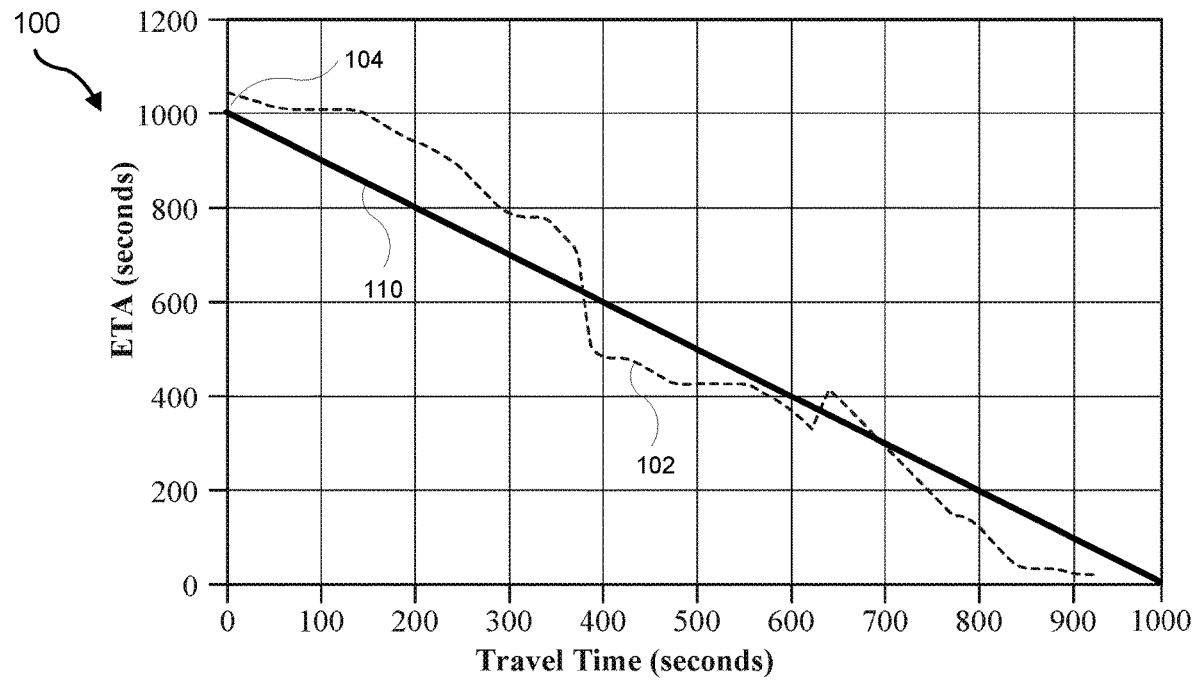
FIGS. 1A-B are illustrations of an example graph of an estimated time of arrival (ETA) progress and an example road map showing a driving route for a pickup for a transportation provider.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to identifying, in real time, a transportation arrangement between a requestor and a provider that could benefit from a re-matching of the requestor with another provider. A dynamic transportation matching system may match a transportation provider with a transportation requestor to complete the transportation request. The dynamic transportation matching system may monitor a progress of the transportation provider to a pickup location as specified in the transportation request. Based on the monitored progress, the dynamic transportation matching system may determine if the transportation provider is making sufficient progress towards the pickup location. In some examples, the dynamic transportation matching system may use a data-driven model (e.g., based on machine learning) to determine if the matching of the transportation provider with a transportation requestor is eligible for cancellation by determining if the transportation provider is not making sufficient progress towards the pickup location. If the dynamic transportation matching system cancels the matching, the dynamic transportation matching system may then match another transportation provider with the transportation requestor to continue to make progress towards completing the transportation request.

As will be explained in greater detail below, embodiments of the instant disclosure may improve the functioning of a computer that uses machine learning to create and maintain a data-driven model that may be stored in a transportation database or other type of data repository for use by the dynamic transportation matching system when identifying a transportation request matched to a transportation provider that may be eligible for cancellation (or bail out). Additionally, or alternatively, embodiments of the instant disclosure may improve the functioning of a computer that accesses data included in the data-driven model stored in the transportation database for use by the dynamic transportation matching system when identifying a transportation request matched to a transportation provider that may be eligible for cancellation (or bail out). The computer may use the accessed data to identify a cancellation eligible matching of a transportation provider to a transportation requestor by, for example, calculating a probability of a cancellation of the matching. The computer, and specifically a dynamic transportation matching system included in the computer, may compare the calculated probability to a threshold to determine whether or not to cancel a match.

Embodiments of the instant disclosure provide improvements in the technical field of transportation service management by monitoring a progress of a transportation provider matched to a transportation requestor (a match) to learn about criteria and circumstances associated with cancelled or bailed out transports and to later apply the learning to a model that a dynamic transportation matching system may use to identify bail out or cancellation eligible transports. As described herein, a dynamic transportation matching system may provide a bail out feature that identifies transports eligible for bail out using a data-driven model that is created and maintained by the dynamic transportation matching system using machine learning. The dynamic transportation matching system may identify a cancellation or bail-out eligible match, may cancel the eligible match, and may match the same transportation request to another transportation provider to continue to make progress towards satisfying the transportation request for the transportation requestor. The dynamic transportation matching system may cancel (or, e.g., facilitate the cancellation of) the match and may match the transportation request to another transportation provider without penalty to the transportation requestor and without benefit to the transportation provider when the dynamic transportation matching system determines that the behavior of a transportation provider is expected to elicit a cancellation (e.g., with a certain probability).

Figure 1B:
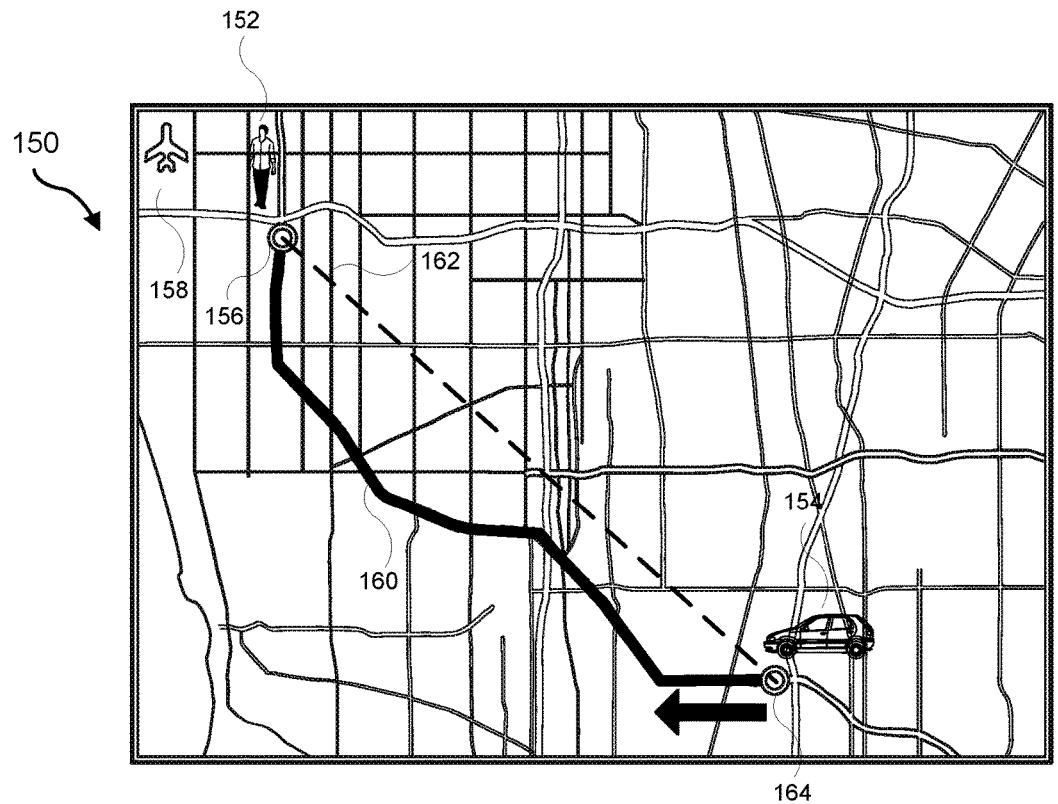

FIGS. 1A-B are illustrations showing a first example of a travel scenario. FIG. 1A is an illustration of an example graph 100 of an estimated time of arrival (ETA) progress. FIG. 1B is an illustration of an example road map 150 showing a driving route for a pickup for a transportation provider.

A transportation requestor 152 submits a transportation request for transportation between a pickup location 156 and a drop-off location 158 (e.g., an airport). A transportation requestor 152 submits the transportation request using a transportation matching application (e.g., an application installed on a mobile computing device of the transportation requestor 152). The transportation matching application may forward the transportation request to a dynamic transportation matching system. The transportation requestor 152 may specify a pickup location (e.g., pickup location 156) by entering the location into the transportation matching application. In addition, or in the alternative, the transportation matching application may automatically set a pickup location for the transportation requestor 152 based on a current location of the transportation requestor 152. For example, the transportation matching application may set the pickup location to a current location of the transportation requestor 152. In another example, the transportation matching application may set the pickup location to a suitable location near the transportation requestor 152.

In some cases, the transportation requestor 152 may submit a transportation request as on-demand transportation request. For example, a transportation request may be effective once submitted to the dynamic transportation matching system. In some cases, the transportation request may specify pick up of the transportation requestor near the time of the request (e.g., within a few minutes of the request). In some cases, the dynamic transportation matching system may operate without advance notice of a transportation request. For example, a transportation request may not have previously been submitted to and/or scheduled with the dynamic transportation matching system. In some cases, the dynamic transportation matching system may operate under one or more constraints and/or objectives to acknowledge acceptance of a submitted transportation request within a short amount of time following the receipt of the transportation request (e.g., within 30 seconds, within 60 seconds, within 90 seconds, etc.).

In the first example of the travel scenario, once the dynamic transportation matching system receives the request, the dynamic transportation matching system matches the transportation requestor 152 with a transportation provider 154. The dynamic transportation matching system may base the matching of the transportation requestor 152 with the transportation provider 154 on one or more factors that may include, but are not limited to, a proximity of the transportation provider 154 to the pickup location 156 and the availability of the transportation provider 154 to get to the pickup location 156 (e.g., the transportation provider 154 is available to provide the transportation as indicated in the transportation request).

The dynamic transportation matching system monitors the progress of the transportation provider 154 to the transportation requestor 152 noting a steady acceptable travel progress (based on an actual travel progression 102) towards arrival of the transportation provider 154 at the pickup location 156 from a starting location 164 by a predetermined ETA 104. In addition, the transportation provider 154 may complete the match by arriving at the pickup location, picking up the transportation requestor 152, and transporting the transportation requestor 152 to the requested drop-off location 158 (e.g., the airport). The dynamic transportation matching system determines that the time of the matching to the time of the arrival of the transportation provider 154 at the pickup location is within (close to) the predetermined ETA 104, while the transportation provider 154 makes continual progress towards the pickup location 156.

For example, the predetermined ETA 104 may be based on a road or street route 160 from the starting location 164 to the pickup location 156. The route 160 may be based on a Haversine distance 162. For example, the route 160 may be the road or street route whose distance is closest to the Haversine distance 162. The dynamic transportation matching system may determine the route 160 as a best route for the transportation provider 154 to take to reach the transportation requestor 152 based on the starting location 164 and the pickup location 156. The predetermined ETA 104 may be based on the route 160 or on any number of alternative routes to the pickup location 156. For example, the predetermined ETA 104 may be based on an estimated or average ETA over many different routes that the transportation provider 154 may take to reach the pickup location 156. Predetermined travel progression 110 shows an ETA verses travel time along the route 160. The dynamic transportation matching system may determine travel progress along the route 160 by comparing an ETA for the predetermined travel progression 110 to an ETA for the actual travel progression 102 at one or more points during the estimated travel time.

In some cases, the dynamic transportation matching system may further base the determination of the best route on other factors that may include, but are not limited to, one-way streets, construction issues (e.g., closed streets, limited access streets), and time of day traffic conditions. For example, the dynamic transportation matching system may determine the best street route to be a route from the starting location 164 to the pickup location 156 whose distance is not the closest to the Haversine distance 162 but whose ETA is less than the ETA of the route whose distance is closest to the Haversine distance 162.

For example, the transportation requestor 152 (e.g., a passenger) may want transportation (e.g., a ride) from their office to the drop-off location 158. The transportation requestor 152 using an application on their mobile computing device contacts a transportation service and makes the request for the transportation. The dynamic transportation matching system of the transportation service matches the transportation provider 154 (e.g., a driver) with the transportation requestor 152. The match is initiated, and the transportation provider 154 arrives at the office of the transportation requestor 152 within the predetermined ETA 104 as shown by the actual travel progression 102. The transportation provider 154 picks up the transportation requestor 152 at the pickup location 156 (the office of the transportation requestor 152) and drives the transportation requestor 152 to the drop off location 158 (e.g., the airport).

Figure 2A:
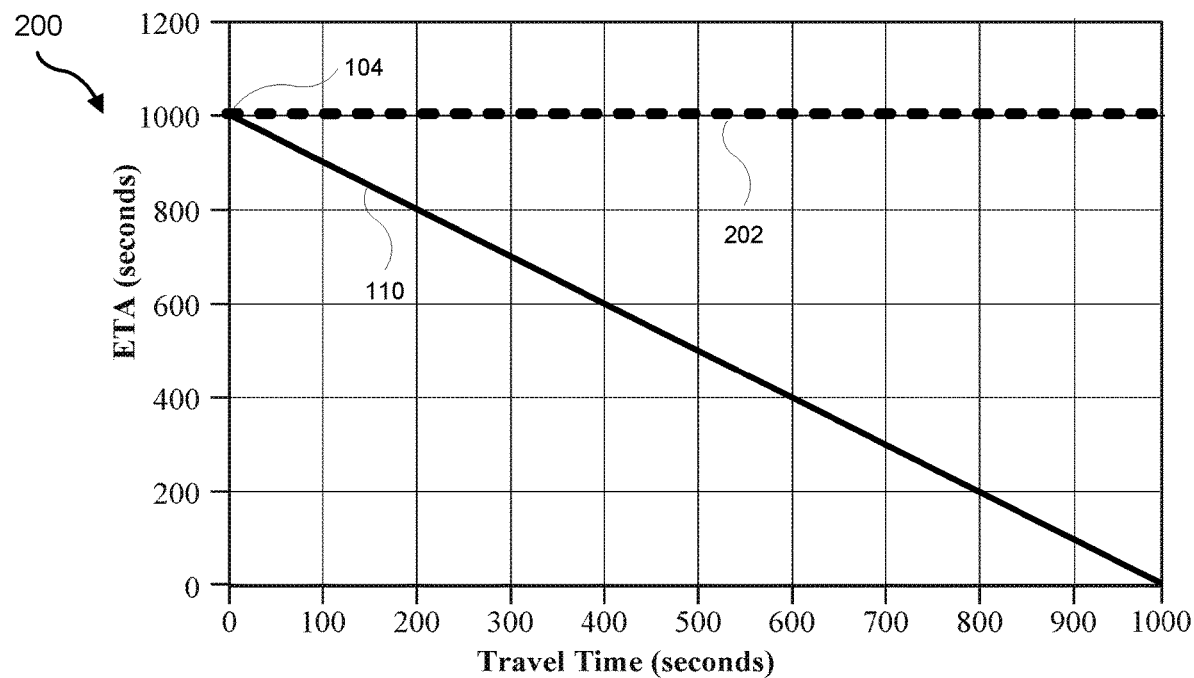
FIGS. 2A-B are illustrations of an example graph of an estimated time of arrival (ETA) progress and an example road map showing a driving route for a bail-out eligible match for a transportation provider.
Figure 2B:
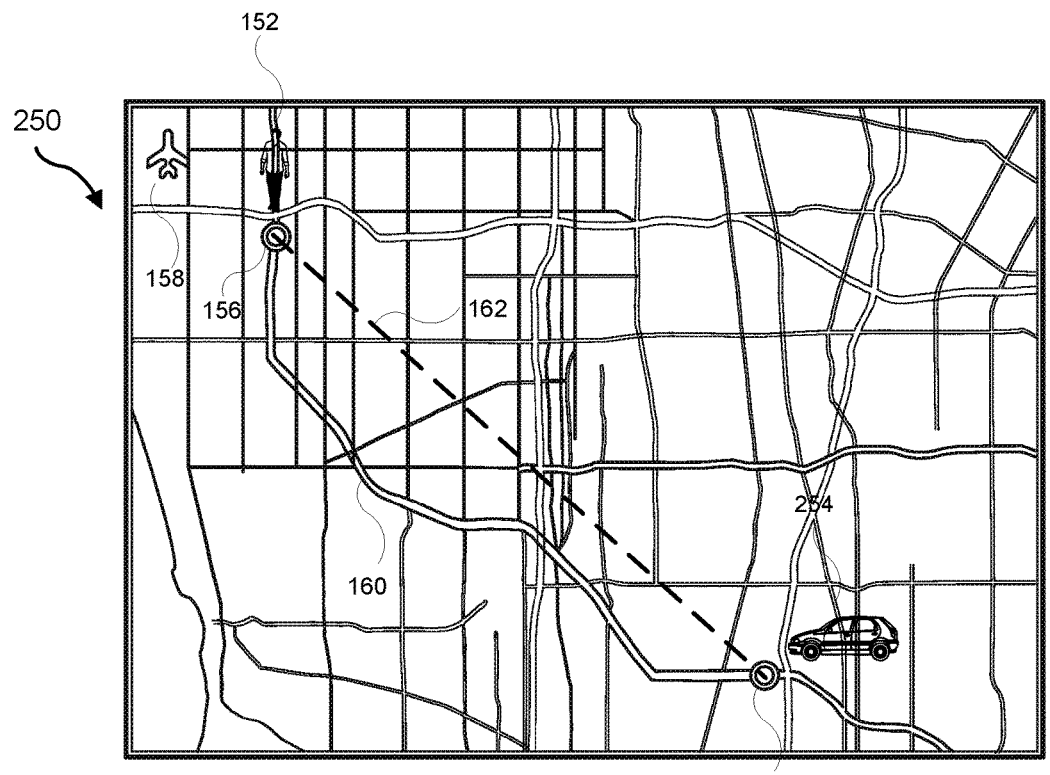

FIGS. 2A-B are illustrations showing a second example of a travel scenario. FIG. 2A is an illustration of an example graph 200 of an estimated time of arrival (ETA) progress. FIG. 2B is an illustration of an example road map 250 showing a driving route for a bail-out eligible match for a transportation provider.

In the second example of the travel scenario, when the transportation requestor 152 submits a transportation request for transportation between the pickup location 156 and the drop-off location 158, upon receiving the request, the dynamic transportation matching system may match the transportation requestor 152 with a transportation provider 254. In the second example, the transportation provider 254 may be different than the transportation provider 154 even though travel of the transportation provider 254 towards the pickup location 156 may begin at the same starting location, the starting location 164. In another example, the transportation provider 254 may begin travel towards the pickup location 156 beginning at another starting location. An ETA and best street route for the transportation provider 254 to take to reach the transportation requestor 152 may be based on the other starting location.

Once the dynamic transportation matching system matches the transportation requestor 152 with the transportation provider 254, the dynamic transportation matching system may monitor the progress of the transportation provider 254 to the transportation requestor 152. The dynamic transportation matching system may determine travel progress along the route 160 by comparing an ETA for the predetermined travel progression 110 to an ETA for an actual travel progression 202 at one or more points during the estimated travel time.

In this example, the dynamic transportation matching system determines little if any change in the actual travel progression 202 as compared to the predetermined travel progression 110. For example, the dynamic transportation matching system determines that as the travel time increases an ETA for the predetermined travel progression 110 decreases while an ETA for an actual travel progression 202 remains fixed or the same. Based on the identified lack of travel progress, the dynamic transportation matching system may identify the transportation request as eligible for cancelling (or bailing out).

In one example, the dynamic transportation matching system, noting the lack of travel progress of the transportation provider 254 towards the pickup location 156 based on comparing the predetermined travel progression 110 to the actual travel progression 202, may automatically cancel the matching of the transportation provider 254 to the transportation requestor 152 and rematch the transportation requestor 152 with a different transportation provider.

For example, the transportation requestor 152 (e.g., a passenger) may want transportation (e.g., a ride) from their office to the drop-off location 158. The transportation requestor 152 may contact a transportation service (e.g., using an application on their mobile computing device) and make the request for the transportation. The dynamic transportation matching system of the transportation service may match the transportation provider 254 (e.g., a driver) with the transportation requestor 152. The process of providing the transportation may then be initiated, and the transportation provider 154, while waiting for the transportation provider 254 to arrive at the office of the transportation requestor 152, may be notified that another transportation provider will be completing the transportation request and, in some cases, an updated ETA may be provided.

Figure 3A:
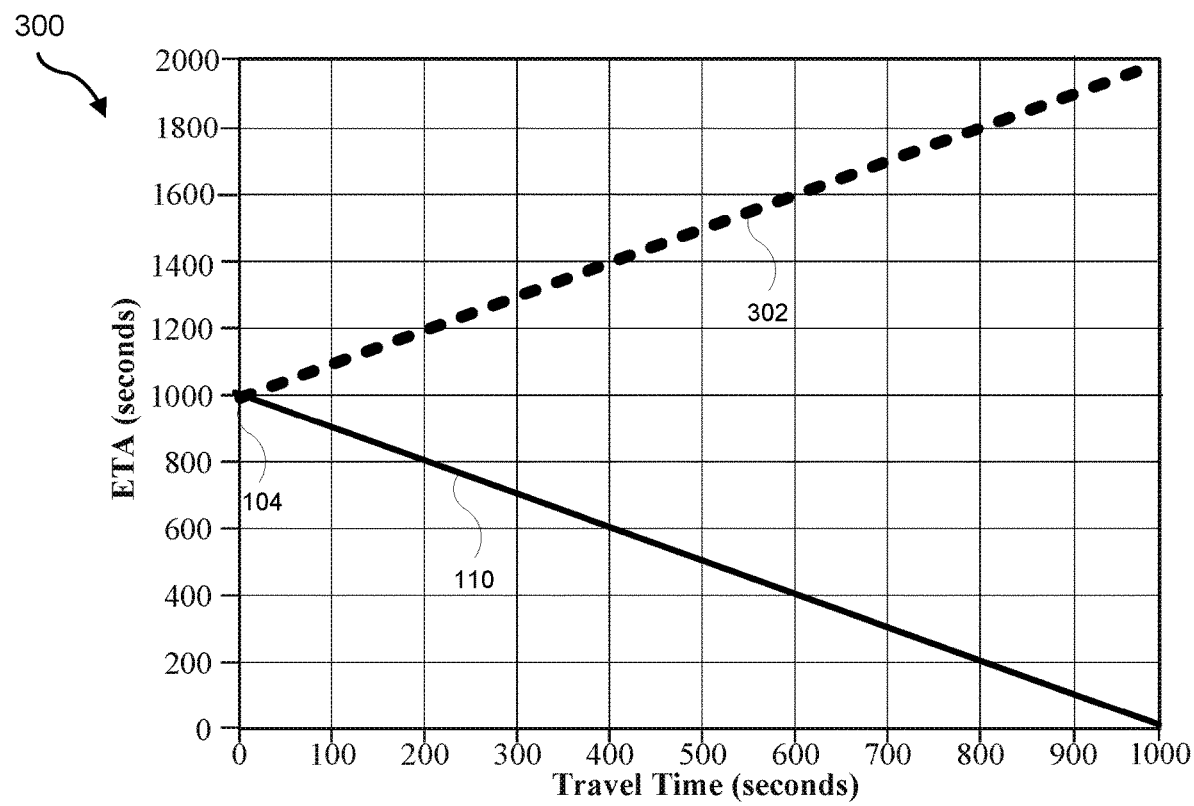
FIGS. 3A-B are illustrations of another example graph of an estimated time of arrival (ETA) progress and an example road map showing a driving route for another bail-out eligible match for a transportation provider.
Figure 3B:
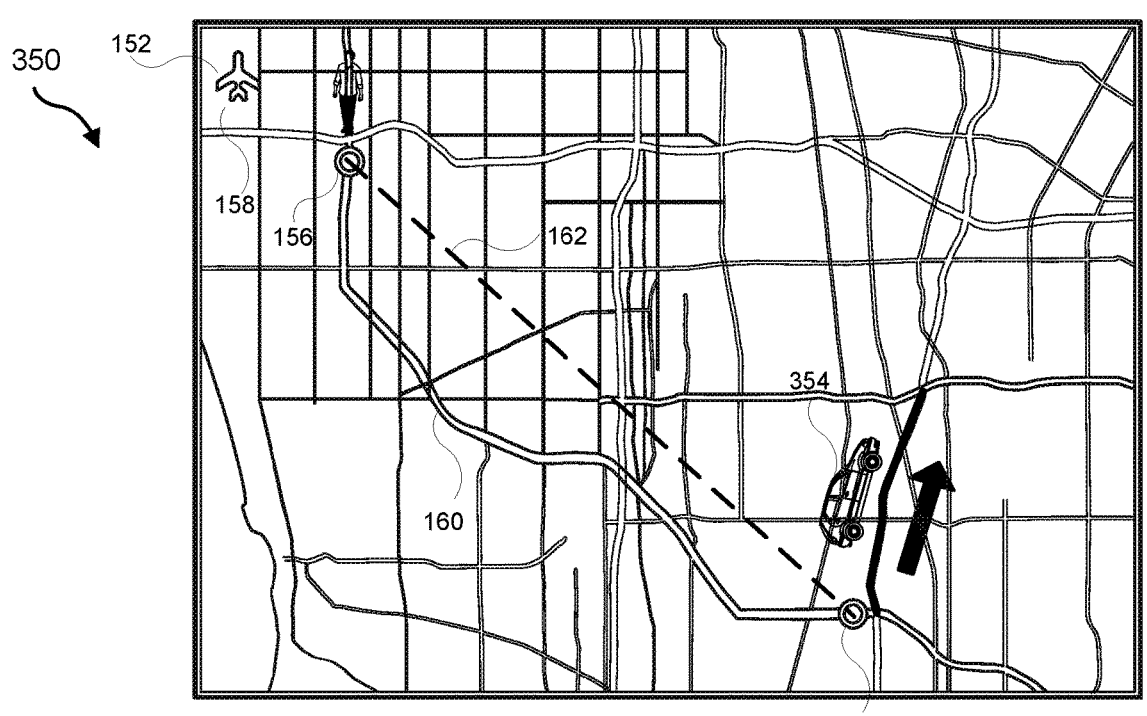

FIGS. 3A-B are illustrations showing a third example of a travel scenario. FIG. 3A is an illustration of an example graph 300 of an estimated time of arrival (ETA) progress. FIG. 3B is an illustration of an example road map 350 showing a driving route for another bail-out eligible match for a transportation provider.

In the third example of the travel scenario, when the transportation requestor 152 submits a transportation request for transportation between the pickup location 156 and the drop-off location 158, upon receiving the request, the dynamic transportation matching system may match the transportation requestor 152 with a transportation provider 354. In the third example, the transportation provider 354 may be different than the transportation provider 154 and may be different than the transportation provider 254 even though travel of the transportation provider 354 towards the pickup location 156 may begin at the same starting location, the starting location 164. In another example, the transportation provider 354 may begin travel towards the pickup location 156 beginning at another starting location. An ETA and best street route for the transportation provider 354 to take to reach the transportation requestor 152 may be based on the other starting location.

Once the dynamic transportation matching system matches the transportation requestor 152 with the transportation provider 354, the dynamic transportation matching system monitors the progress of the transportation provider 354 to the transportation requestor 152 from the starting location 164 as travel progress away from the pickup location 156 based, at least in part, on an actual travel progression 302 whose ETA to the pickup location 156 increases as the travel time increases while the ETA for the predetermined travel progression 110 decreases as the travel time increases. The dynamic transportation matching system may determine travel progress along the route 160 by comparing an ETA for the predetermined travel progression 110 to an ETA for an actual travel progression 302 at one or more points during the estimated travel time. Based on the identified lack of travel progress towards the pickup location 156, the dynamic transportation matching system may identify the transportation request as eligible for cancelling (or bailing out).

In one example, the dynamic transportation matching system, noting the lack of travel progress of the transportation provider 354 towards the pickup location 156, may automatically cancel the matching of the transportation provider 354 to the transportation requestor 152 and rematch the transportation requestor 152 with a different transportation provider.

For example, the transportation requestor 152 may want transportation from their office to the drop-off location 158 (e.g., the airport). The transportation requestor 152 may contact a transportation service (e.g., using an application on their mobile computing device) and makes the request for the transportation. The dynamic transportation matching system of the transportation service may match the transportation provider 354 (e.g., a driver) with the transportation requestor 152. The process of providing the transportation may then be initiated, and the transportation provider 154, while waiting for the transportation provider 354 to arrive at the office of the transportation requestor 152, may be notified that another transportation provider will be completing the transportation request and, in some cases, an updated ETA may be provided.

In some cases, the transportation requestor 152 may decide, after submitting the transportation request, that they no longer need transportation. For example, the transportation requestor 152 may submit the transportation request for transportation from their office to the airport. A short time later (e.g., a few minutes, less than two minutes, less than five minutes, etc.) a colleague of the transportation requestor 152 offers to drive the transportation requestor 152 to the airport. In this example, the transportation requestor 152 may cancel the transportation request. Depending on the time lapse between the matching of the transportation requestor 152 with a transportation provider and the cancellation of the transportation request, the transportation requestor 152 may or may not incur some type of charge or cost. For example, the transportation requestor 152 may be charged a small cancellation fee. In another example, the transportation requestor 152 may use a small number of account credits that the transportation requestor 152 may use towards payments for transportation from the transportation service. For the example travel scenarios shown in FIGS. 2A-B and FIGS. 3A-B, in some cases, the transportation requestor 152 may cancel the transportation request. In some cases, if the dynamic transportation matching system determines, based on the monitoring of the actual travel progression of the transportation provider as compared to the predetermined travel progression, that the transportation provider is not making adequate progress towards the pickup location, the dynamic transportation matching system may cancel the transportation request.

For example, adequate progress may be defined by a threshold time value that an ETA for the actual travel progression at a point in the travel time must meet or be less than at a selected travel time. The threshold time may be determined, at least in part, on the predetermined travel progression at the selected travel time. In another example, adequate progress may be defined as a threshold distance value that a distance traveled by the transportation provider must meet or exceed at a selected travel time. The threshold distance value may be determined, at least in part, on a distance traveled at the selected travel time for the predetermined travel progression.

In some cases, the cancellation of the transportation request by the dynamic transportation matching system may impact one or more performance ratings associated with the transportation provider matched to the transportation requestor. There are, however, many factors that may influence the determination of when and/or if the dynamic transportation matching system should cancel a transportation request. The dynamic transportation matching system may use machine learning to create, update, and/or otherwise edit data model(s) for use in making these determinations as will be described further in the instant disclosure. The use of machine learning and data model(s) may increase the accuracy of the dynamic transportation matching system determining if a transportation request should be cancelled. In addition, or in the alternative, the use of machine learning and data model(s) may increase the accuracy of the dynamic transportation matching system determining if a transportation provider matched to a transportation requestor for the transportation request should incur any penalties or negative impact because of the cancellation.

For example, referring to the second scenario described with reference to FIGS. 2A-B, the transportation provider 254 makes little to no progress towards the pickup location 156 after 1000 seconds of travel time (the ETA 104) as shown by the actual travel progression 202 because as the travel time increases the actual ETA remains the same. For example, referring to the third scenario described with reference to FIGS. 3A-B, the transportation provider 354 appears to be driving away from the pickup location 156 after 1000 seconds of travel time (the ETA 104) as shown by the actual travel progression 302 because as the travel time increases the actual ETA is increasing.

There may be some circumstances where a transportation provider may not be able to acknowledge acceptance of a transportation request. Completing a transportation request includes the matching of a transportation provider with a transportation requestor and the transportation provider arriving at a requested pickup location within a predetermined ETA. For example, the transportation provider may refuse or turn down a matching to a transportation requestor. This may be referred to as lapsing. In another example, a transportation provider may face unanticipated circumstances and the transportation provider may cancel the transportation request after the matching of the transportation provider to the transportation requestor but before reaching the pickup location. In another example, facing unanticipated circumstances, the transportation provider may contact the transportation requestor after being matched to the transportation requestor but before reaching the pickup location requesting that the transportation requestor cancel the transportation request. Not completing a transportation request based on one or more of the above recited circumstances may impact the transportation provider by lowering an acceptance rate associated with the transportation provider, increasing a cancellation rate associated with the transportation provider, and/or increasing an offense rate associated with the transportation provider.

To improve the overall transportation experience of the transportation requestor, reduce any negative impact on the transportation provider, and predict a probability of a cancellation of a transportation request at regular time intervals along the travel time, a dynamic transportation matching system may build one or more data-driven models using machine learning. The dynamic transportation matching system may use the data-driven model(s) to calculate a cancel probability score at regular intervals during the travel time of a transportation request. The dynamic transportation matching system may identify transportation requests eligible for cancellation (or bailing out) in a timely manner based on the calculated probability score at a point in time along the travel time. Identifying a bail-out eligible transportation request, cancelling the transportation request, and re-matching the transportation requestor with another transportation provider may result in increased customer satisfaction, more efficient matchings, and improved performance by transportation providers.

In some cases, when a transportation request is cancelled, the re-matching of the transportation requestor with another transportation provider may be given a higher priority than the initial transportation request. In some cases, when a transportation request is cancelled, the re-matching of the transportation requestor with another transportation provider may be performed so that the ETA for the arrival of the transportation provider to the pickup location is improved over the ETA for the previously cancelled transportation request. For example, the re-matching may match a second transportation provider with the transportation requestor where the second transportation provider is located closer to the first transportation provider originally matched with the transportation requestor. In some cases, the re-matching may be performed only in cases where the second transportation provider is located closer to the first transportation provider originally matched with the transportation requestor. In some cases, when a transportation request is cancelled and a re-matching of the transportation requestor with another transportation provider occurs, the transportation requestor may be guaranteed that an original agreed upon fare for the transportation will not increase.

The challenges facing the dynamic transportation matching system when determining if a transportation request should be cancelled may include external factors that may contribute to an error in the calculated ETA for a transportation request but that may be unrelated to the actual progress of the transportation provider to the pickup location. The factors may include, but are not limited to, one-way streets, day and time for the requested transportation, geographic location (e.g., a geohash), unusual and/or unexpected traffic conditions (e.g., closed roads, construction, accidents), forced detours from the identified best route, navigation errors (e.g., missed turns), general poor navigation (e.g., drives in circles, goes around the block, etc.), and weather conditions (e.g., heavy rain, snow, sleet, hail). For example, the transportation provider may be stuck in traffic, making little to no progress to the pickup location. In another example, road construction may require the transportation provider to take an indirect route (a less than optimal route) to the pickup location, at times appearing to drive away from the pickup location.

In some cases, however, the reasons for lack of progress may be related to the transportation provider appearing to not move towards the pickup location or appearing to drive away from the pickup location without any apparent reason as to why this is happening. The dynamic transportation matching system may use machine learning to generate or create a first model that may be used to determine if a transportation request is eligible for cancellation based on the factors that are unrelated to the progress of the transportation provider towards the pickup location and then may generate or create a second model that includes the progress information for the transportation provider in the first model. The two models may allow the dynamic transportation provider to identify if the scenario, criteria, and/or conditions for the eligibility of the transportation request for cancellation is due to external factors or just to factors associated with the progress of the transportation provider.

Figure 4:
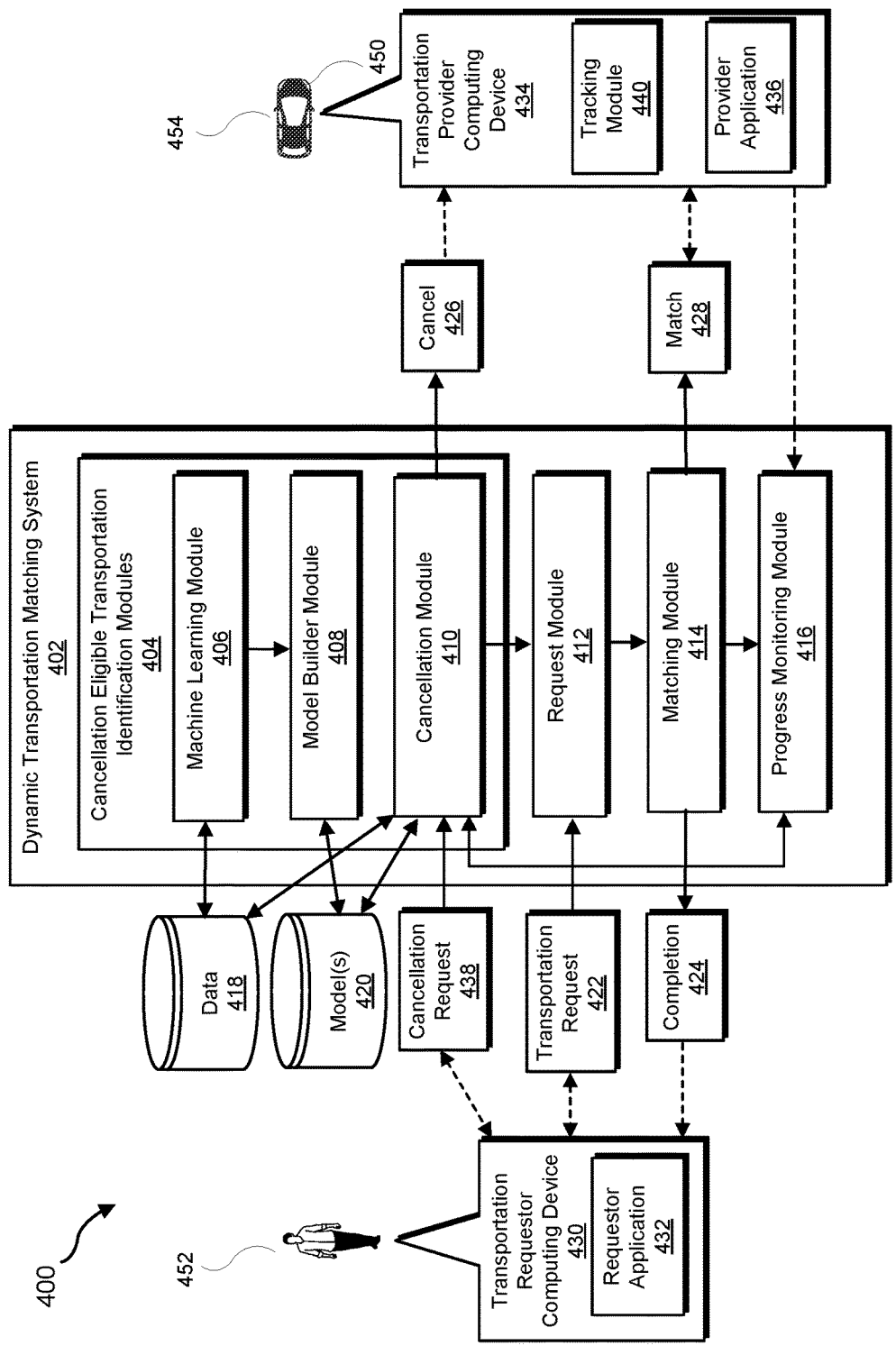
FIG. 4 is a block diagram of an example system showing a transportation requestor and a transportation provider interacting with a dynamic transportation matching system.

FIG. 4 is a block diagram of an example system 400 showing a transportation requestor 452 and a transportation provider 454 interacting with a dynamic transportation matching system 402. Referring to FIGS. 1A-B, 2A-B, and 3A-B, the transportation requestor 452 may be the transportation requestor 152 and the transportation provider 454 may be one of the transportation provider 154, the transportation provider 254, or the transportation provider 354.

As shown in FIG. 4, the dynamic transportation matching system 402 may include cancellation eligible transportation identification modules 404, a request module 412, a matching module 414, and a progress monitoring module 416 that may perform one or more of the processes, methods, or steps described herein. In some embodiments, the request module 412 may be configured using a single module or multiple modules. In some embodiments, the matching module 414 may be configured using a single module or multiple modules. In some embodiments, the progress monitoring module 416 may be configured using a single module or multiple modules.

The dynamic transportation matching system 402 may be configured or implemented using any computing system and/or set of computing systems capable of performing the functions of the dynamic transportation matching system 402 such as machine learning, model building, transportation matching, and transportation monitoring. The dynamic transportation matching system 402 may receive a transportation request 422 at the request module 412 from a transportation requestor computing device 430 of the transportation requestor 452. The matching module 414 may match the transportation requestor 452 with a transportation provider 454 providing a match 428 to a transportation provider computing device 434 of the transportation provider 454. The progress monitoring module 416 may monitor a progress of the transportation provider 454 towards a pickup location as specified in the transportation request 422 by way of the transportation provider computing device 434. The dynamic transportation matching system 402 may determine if the transportation request 422 is cancelled before completion 424.

As described herein, for example, the transportation requestor 452 may cancel the transportation request 422 after the match 428 but before completion 424 by providing a cancellation request 438 by way of the transportation requestor computing device 430. In these cases, the dynamic transportation matching system 402 may identify one or more factors associated with the attempt to complete the transportation request 422. The dynamic transportation matching system 402 may store these identified factors in a data repository 418 (e.g., a database) for use by a machine learning module 406 included in the cancellation eligible transportation identification modules 404. In some examples, as described herein, the transportation requestor 452 may cancel the transportation request 422 (provide the cancellation request 438 by way of the transportation requestor computing device 430) because they changed their mind and no longer want or need transportation.

In other examples, described herein, the transportation requestor 452 may cancel the transportation request 422 (provide the cancellation request 438 by way of the transportation requestor computing device 430) based on the transportation requestor 452 perceiving a lack of progress by the transportation provider 454 towards arriving at the pickup location, as specified in the transportation request 422, based on a calculated ETA. As described herein, one or more external factors may contribute to an error in the calculated ETA for completion of a transportation request that may be unrelated to the actual progress of the transportation provider to the pickup location. In addition, or in the alternative, as described herein, one or more transportation provider related factors may contribute to the transportation requestor 452 perceiving a lack of progress by the transportation provider 454 towards arriving at the pickup location.

The machine learning module 406 may access the external factors related to cancellation of transportation requests. The machine learning module 406 using a model builder module 408 may build one or more data-driven first models for storage in a model repository 420 (e.g., a database) based on the external factors. In addition, or in the alternative, the machine learning module 406 may access the transportation provider related factors that are related to cancellation of transportation requests. The machine learning module 406 using a model builder module 408 may build one or more data-driven second models for storage in the model repository 420 based on the transportation provider related factors.

A cancellation module 410 may determine that a match (e.g., the match 428) is eligible for cancellation. For example, the cancellation module 410 may receive the cancellation request 438. Based on receiving the cancellation request 438, the cancellation module 410 may inform the transportation provider 454 that the matching of the transportation provider 454 to the transportation requestor 452 is cancelled by providing cancel 426 to the transportation provider computing device 434. Subsequent to the cancellation, the dynamic transportation matching system 402 may match the transportation requestor 452 with another transportation provider in order to complete the transportation request 422.

In another example, the cancellation module 410 may receive progress information and data from the progress monitoring module 416. The cancellation module 410 may access one or more data-driven models included in the model repository 420. As described herein, the cancellation module 410 may determine that the match 428 is eligible for cancellation based on the data-driven models and the monitored progress. For example, as described with reference to FIGS. 1A-B, 2A-B, and 3A-B, the cancellation module 410 may use the data included in the one or more data-driven models and the received progress information to calculate a probability that, at a particular point in time between the start of travel of the transportation provider 454 to the pickup location to the arrival of the transportation provider 454 at the pickup location, the transportation request 422 will be cancelled. The cancellation module 410 may compare the calculated probability to a threshold (e.g., a cancellation probability threshold value) to determine if the transportation request 422 is eligible for cancellation.

In some implementations, if the cancellation module 410 determines that the transportation request 422 is eligible for cancellation, prior to the cancellation module 410 cancelling the matching of the transportation provider 454 to the transportation requestor 452 (e.g., cancel 426), the cancellation module 410 may determine if the transportation requestor 452 may be matched with a different (another) transportation provider in order to complete the transportation request 422. If another transportation provider may be matched with the transportation requestor, the cancellation module 410 may then cancel the matching of the transportation provider 454 to the transportation requestor 452 by providing the cancel 426 to the transportation provider computing device 434, and then rematch the transportation requestor 452 to the other identified transportation provider in order to complete the transportation request 422.

The dynamic transportation matching system 402 may be in communication with computing devices included in vehicles that may provide the transportation needed to complete transportation requests. For example, a vehicle 450 of the transportation provider 454 may include the transportation provider computing device 434. The vehicle 450 may represent any vehicle that may provide the transportation needed to complete transportation requests. In some examples, the vehicle 450 may be any vehicle make or model. In some examples, the vehicle 450 may be a standard commercially available vehicle. According to some examples, vehicles that provide the transportation needed to complete transportation requests may each be owned by separate individuals (e.g., transportation providers). In some examples, the vehicle 450 may be human-operated. In some examples, the vehicle 450 may be an autonomous (or partly autonomous) vehicle. Accordingly, throughout the instant disclosure, references to a "transportation provider" (or "provider") may, where appropriate, refer to an autonomous vehicle, an owner of an autonomous vehicle, an operator of an autonomous vehicle, an attendant of an autonomous vehicle, and/or an autonomous system for piloting a vehicle. In some examples, the vehicle 450 may be included in a dynamic transportation network of vehicles that may provide transportation on an on-demand basis to transportation requestors.

The dynamic transportation matching system 402 may communicate with a computing device (e.g., the transportation requestor computing device 430) used by the transportation requestor 452. The transportation requestor computing device 430 may provide transportation requests (e.g., the transportation request 422) to the dynamic transportation matching system 402. The dynamic transportation matching system 402 may communicate with a computing device (e.g., the transportation provider computing device 434) included in the vehicle 450. The transportation requestor computing device 430 and the transportation provider computing device 434 may be any suitable type of computing device. In some implementations, the computing device may be a mobile computing device. Examples of a mobile computing device may include, but are not limited to, a laptop computer, a smartphone, a tablet computer, a personal digital assistant, or any other type or form of mobile computing device). In some implementations, the computing device may be a wearable computing device. Examples of a wearable computing device may include, but are not limited to, a smart glass or a smart watch.

In some implementations, the transportation provider computing device 434 may be a device suitable for temporarily mounting in a vehicle (e.g., for use by a transportation provider for a transportation matching application, a navigation application, and/or any other application suited for the use of a transportation provider). In addition, or in the alternative, the transportation provider computing device 434 may be a device suitable for installing in a vehicle and/or may be a computer included in the vehicle that has a transportation management system application installed on the computer in order to provide transportation services to transportation requestors (e.g., the transportation requestor 452) and/or to communicate with a dynamic transportation matching system (e.g., the dynamic transportation matching system 402).

The transportation provider computing device 434 may include a provider application 436. The provider application 436 may be an application, a program, and/or a module that may provide one or more services related to operating a vehicle and/or related to providing transportation matching services. In some implementations, the provider application 436 may interface to a tracking module 440. In some implementations, the provider application 436 may include a transportation matching application for a provider. In some implementations, the provider application 436 may match the user of the provider application 436 (e.g., the transportation provider 454) with a transportation requestor (e.g., the transportation requestor 452) through communication with the dynamic transportation matching system 402. The provider application 436 may provide the dynamic transportation matching system 402 with information about the transportation provider 454. For example, the provider application 436 may receive location information from the tracking module 440 that may include a current location of the transportation provider 454. The provided information may include an availability of the transportation provider 454 for completing a transportation request. The dynamic transportation matching system 402 may use the information in order to provide dynamic transportation matching and/or management services for the transportation provider 454 and the transportation requestor 452. In some implementations, the provider application 436 may coordinate communications and/or a payment between the transportation requestor 452 and the transportation provider 454. In some implementations, the provider application 436 may provide a map service, a navigation service, a traffic notification service, and/or a geolocation service.

The transportation requestor computing device 430 may include a requestor application 432. The requestor application 432 may be an application, a program, and/or a module that may provide one or more services related to the providing of on-demand transportation and services that may include contacting a transportation service to request transportation, monitoring the completion of the transportation request, and allowing the cancellation of the transportation request.

In some embodiments, the machine learning module 406 may be configured using a single module or multiple modules. In some embodiments, the model builder module 408 may be configured using a single module or multiple modules. In some embodiments, the cancellation module 410 may be configured using a single module or multiple modules.

In some implementations, the model repository 420 may include one or models for use by the cancellation module 410 that may not be based on machine learning. For example, one or more models included in the model repository 420 can include non-progress related data for use by the cancellation module 410 when determining if a match is eligible for cancellation. In another example, one or more models included in the model repository 420 can include data related to localized features for a match for use by the cancellation module 410 when determining if the match is eligible for cancellation.

In some implementations, an accuracy of a machine-learned model may vary depending on the geographic region to which the model is applied. For example, the dynamic transportation matching system 402 using a data-driven model may identify more false positives (e.g., may erroneously identify bail-out eligible matches) in geographic regions where the number of matches are smaller when compared to other geographic regions considered more mature with larger match numbers. This may occur because, since the data-driven model is trained to predict cancellations, the larger the number of matches in a geographic region the more accurate the predictability of the model. In these implementations, for example, the cancellation module 410, when comparing a calculated probability for a bail-out of a match to a threshold to determine if the match should be cancelled, can use a different threshold dependent on the geographic region associated with the match in order to reduce the number of false positives (e.g., reduce the number of identified bail-out eligible matches).

Geographic clustering may identify one or more geohashes in cases where a geographic region may be too large and diverse to provide any meaningful data. A geographic cluster may capture attributes associated with a geographic location that may affect a progress of a provider to a pickup location for a match and that may also affect a cancellation rate for the match. Attributes of the geographic location that may be captured may include, but are not limited to, a match cancellation rate, urbanness (e.g., distance to the closest urban geohash), pickup ETA distribution (e.g., in deciles or percentiles, mean, variances, etc.), pickup ETA error (e.g., mean square error (MSE), mean absolute error (MAE)), fare distribution (e.g., in deciles or percentiles, mean, variances, etc.), average weekly matches, average weekly active providers, and average weekly active requestors. In some implementations, geohashes may be clusters based on one or more of the attributes of a geographic location. In these implementations, for example, the machine learning module 406 using the model builder module 408 may train and tune individual data-driven models for each geographic cluster resulting in fewer false positives (e.g., fewer erroneously identified bail-out eligible matches). The model builder module 408 can store the trained and tuned data-driven models in the model repository 420 for use by the cancellation module 410.

In some cases, one or more external factors not related to the progress of a provider towards a pickup location may contribute to a cancellation of a match. The one or more external factors can include, but are not limited to, ETA provided to a requestor once matched with a provider, ride type (e.g., ridesharing, plus, premier, luxury, sport utility vehicle (SUV), etc.), geographic location of the pickup, and pickup time (e.g., day of the week, hour of the day, etc.). In order to provide an improved framework for attributing cancellation of a match to a progress of the provider towards the pickup location, the probability of a cancellation of the match based on one or more external factors may be taken into account.

For example, P(A) is the probability of a cancellation of a match based on external factors not associated with provider progress. P(B) is the probability of a cancellation of a match that may be based on provider progress and external factors not associated with provider progress. P(B)−P(A) applied to a well-tuned threshold value can determine if a cancellation of a match may occur based on provider progress. Expression 1 may also be applied to a well-tuned threshold value to determine if a cancellation of a match may occur based on provider progress.

$$\max\{P(B)-P(A),0\}/P(A) \qquad (1)$$

Figure 5:
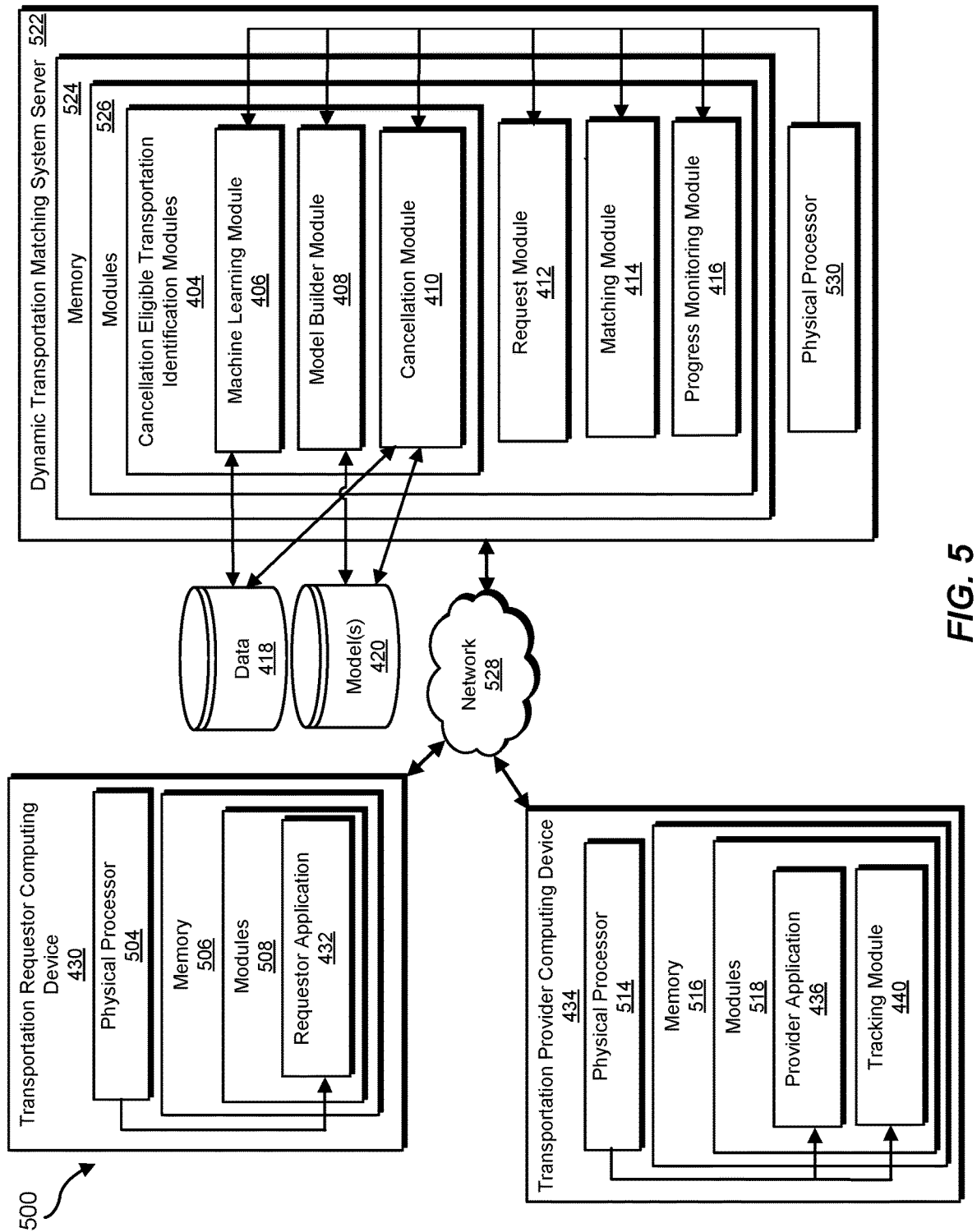
FIG. 5 is a block diagram of an example dynamic transportation matching system that may monitor a progress of a match and determine if the match of the transportation provider with the transportation requestor is eligible for cancellation and re-matching.

FIG. 5 is a block diagram of an example dynamic transportation management system 500 that may monitor a progress of a match and determine if the match of the provider with the requestor is eligible for cancellation and re-matching.

Referring at times to FIG. 4, the transportation management system 500 may include a dynamic transportation matching system server 522. The dynamic transportation matching system server 522 may include a memory 524 which may include one or more modules 526. The module(s) 526 may include the cancellation eligible transportation identification modules 404, the request module 412, the matching module 414, and the progress monitoring module 416. The dynamic transportation matching system server 522 may include at least one physical processor 530. In some implementations, the dynamic transportation matching system 402 may be included as part of the dynamic transportation matching system server 522.

The transportation management system 500 may include the transportation requestor computing device 430 that is communicatively coupled to the dynamic transportation matching system server 522 by way of a network 528. The transportation management system 500 may include the transportation provider computing device 434 that is communicatively coupled to the dynamic transportation matching system server 522 by way of the network 528.

The transportation requestor computing device 430 includes a memory 506 which may include one or more modules 508. The module(s) 508 may include the requestor application 432. The transportation requestor computing device 430 may include at least one physical processor 504. The transportation provider computing device 434 includes a memory 516 which may include one or more modules 518. The module(s) 518 may include the provider application 436 and the tracking module 440. The transportation provider computing device 434 may include at least one physical processor 514.

As detailed above, the computing devices and systems described and/or illustrated herein broadly represent any type or form of computing device or system capable of executing computer-readable instructions, such as those contained within the modules and applications described herein. In their most basic configuration, these computing device(s) may each include at least one memory device and at least one physical processor.

The transportation management system 500 may include one or more repositories such as the data repository 418 and the model repository 420. In some examples, the term "repository" generally refers to any type or form of data storage. A repository may include one or more data stores, such as databases, object storage systems and services, cloud-based storage services, and other data stores. In some implementations, a repository may be implemented on a non-transitory storage medium accessible by the dynamic transportation matching system server 522. For example, as shown in FIG. 5, the data repository 418 and the model repository 420 may be locally connected or coupled to, or directly interfaced to, the dynamic transportation matching system server 522. In some implementations, the data repository 418 and/or the model repository 420 may be communicatively coupled to the dynamic transportation matching system server 522 by way of the network 528. In some implementations, the data repository 418 and/or the model repository 420 may be included as part of a storage-area network or other networked storage system.

In some examples, the term "memory device" generally refers to any type or form of volatile or non-volatile storage device or medium capable of storing data and/or computer-readable instructions. In one example, a memory device may store, load, and/or maintain one or more of the applications and/or modules described herein. Examples of memory devices may include, but are not limited to, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory devices. In another example, a physical processor may execute computer-readable instructions included in one or more of the applications and/or modules stored in the above-described memory devices. Examples of physical processors may include, but are not limited to, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain implementations one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data regarding cancelled transportation requests to be transformed. One or more of the modules recited herein may transform the cancelled transportation request related data that may include information regarding external factors as well as progress information for a transportation provider. One or more of the modules recited herein may output a result of the transformation to create, update, and/or modify one or more data-driven models using machine learning. One or more of the modules recited herein may use the result of the transformation to identify a transportation requestor matched with a first transportation provider whose match is eligible for cancellation. One or more of the modules recited herein may use the result of the transformation to identify a second transportation provider for matching with the transportation requestor responsive to the cancellation of the matching of the transportation requestor with the first transportation provider. One or more of the modules recited herein may store the result of the transformation. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some implementations, the machine learning module 406 may access ride cancellation data included in the data repository 418. The machine learning module 406 may identify transportation requests and categorize them into one of two binary classes, a positive class and a negative class. Transportation requests categorized or grouped into a positive class may include completed transportation requests (the transportation provider arrived at the pickup location). Transportation requests categorized or grouped into a negative class may include transportation requests cancelled by the transportation requestor and/or transportation requests cancelled by the transportation provider before the arrival of the transportation provider at the pickup location.

The machine learning module 406 may apply one or more filters on transportation request related data included in the data repository 418 for the training of the machine learning. The machine learning module 406 may use the filters to exclude transportation requests (some of which may have been cancelled) from being included in training data for a model for identifying transportation requests eligible for cancellation. The machine learning module 406 may exclude a transportation request from the training data based on data related to the transportation request.

In some implementations, the machine learning module 406 may exclude from the training data transportation requests that are considered quickly cancelled. For example, the transportation requestor may cancel the transportation request before being matched with a transportation provider. In another example, the transportation requestor may cancel the transportation request within a window of time after the matching of the transportation requestor with the transportation provider (e.g., less than one minute after the matching, less than 30 seconds after the matching).

In some implementations, the machine learning module 406 may exclude from the training data transportation requests that a transportation requestor cancels after the transportation provider arrives at the pickup location. In some implementations, the machine learning module 406 may exclude from the training data transportation requests where the transportation provider indicted arrival a predetermined distance considered far from the pickup location. For example, a transportation provider clicked arrived for pickup when the transportation provider was located more than 0.3 miles from the pickup location.

In some implementations, the machine learning module 406 may exclude from the training data transportation requests where the ETA from the starting location of the transportation provider to the pickup location is greater than a predetermined amount of time. For example, the machine learning module 406 may exclude from the training data transportation requests where the ETA from the starting location of the transportation provider to the pickup location is greater than thirty minutes. As described herein with reference to FIGS. 1A-B, 2A-B, and 3A-B, in some implementations, the machine learning module 406 may exclude from the training data transportation requests with predetermined gaps of time between data points (e.g., no ETA data for a predetermined period of travel time). For example, no ETA data is available for an actual travel progression for at least an identified timeframe (e.g., 30 seconds, 45 seconds, 60 seconds) because no location updates are received from the transportation provider during the identified timeframe. In this example, it may be difficult to determine a distance traveled by the transportation provider and a speed of the travel during the identified timeframe.

As described herein, the tracking module 440 may include an application or service that monitors a progress of a transportation provider towards a pickup location. The transportation provider computing device 434 may provide data reflective of the monitoring of the progress to the dynamic transportation matching system server 522 by way of the network 528. For example, the data may include distance information (e.g., distance traveled, distance remaining), an actual ETA, a speed, and a geographic location (e.g., latitude and longitude coordinates). The progress monitoring module 416 may use the data to determine a progress of the transportation provider to the pickup location. For example, the tracking module 440 may log data associated with a transportation provider at a regular time interval (e.g., every five seconds, every ten seconds, every 15 seconds).

Referring to FIGS. 1A-B, 2A-B, 3A-B, 4, and 5, the dynamic transportation matching system 402 may determine, by monitoring the progress of the transportation provider 254 to the pickup location 156 as described herein, that the matching of the transportation requestor 152 to the transportation provider 254 may be eligible for cancellation (and e.g., subsequent re-matching). The dynamic transportation matching system 402 may determine, by monitoring the progress of the transportation provider 354 to the pickup location 156 as described herein, that the matching of the transportation requestor 152 to the transportation provider 354 may be eligible for cancellation (and e.g., subsequent re-matching).

Figure 6A:
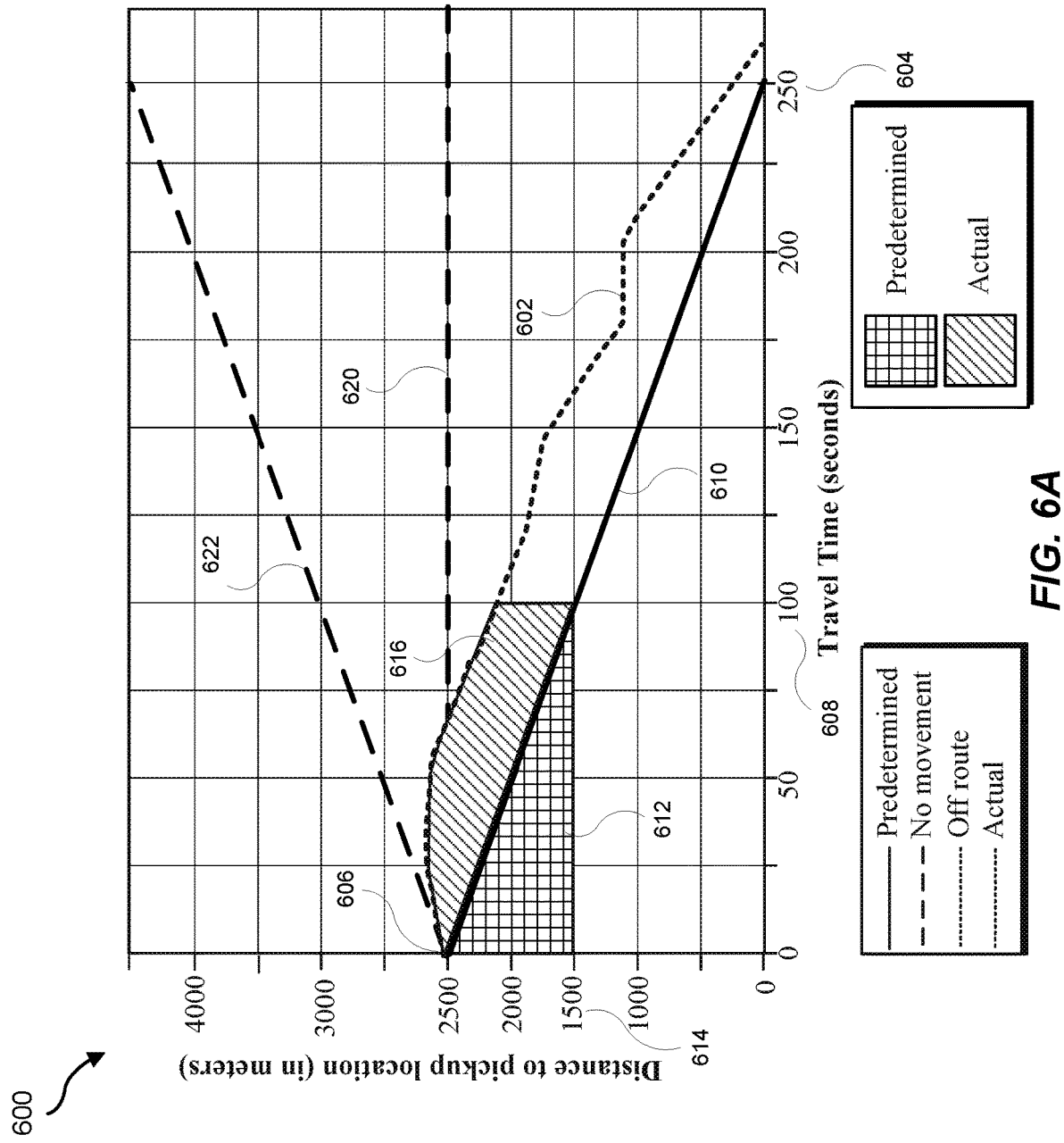
FIGS. 6A-B are example graphs showing progress of a transportation provider towards a pickup location as an area under a curve.
Figure 6B:
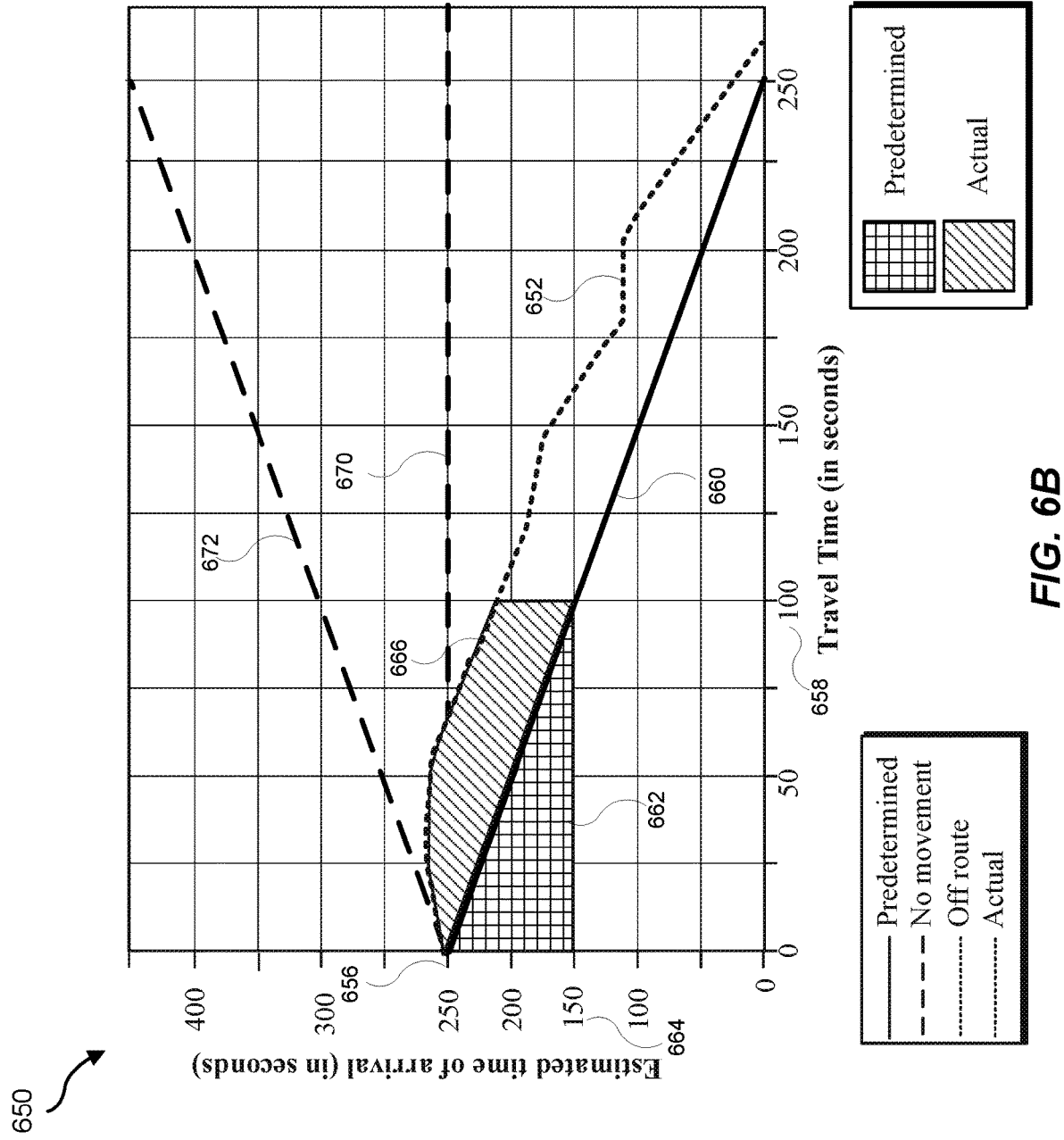

FIGS. 6A-B are example graph 600 and graph 650, respectively, showing progress of a transportation provider towards a pickup location as an area under a curve. Referring to FIG. 6A, the example graph 600 shows a general decrease in a distance to the pickup location as a travel time towards the pickup location increases. Referring to FIG. 6B, the example graph 650 shows a general decrease in an ETA to the pickup location as a travel time towards the pickup location increases.

Referring to FIGS. 1A-B, 2A-B, 3A-B, and FIG. 6A, a predetermined travel progression 610 shows a distance to the pickup location linearly decreasing as the time since the matching of a transportation provider to a transportation requestor increases. The predetermined travel progression 610 may be based on a Haversine distance between the starting location of the transportation provider and the pickup location. For example, a dynamic transportation matching system (e.g., the dynamic transportation matching system 402 as shown in FIG. 4) matches a transportation provider with a transportation requestor. The dynamic transportation matching system may determine that a travel distance from the starting location of the transportation provider to the pickup location, based on a Haversine distance, is travel distance 606 (e.g., 2500 meters). The dynamic transportation matching system may determine an average travel speed for the predetermined travel progression 610 that results in the transportation provider arriving at the pickup location at arrival time 604 (e.g., 250 seconds) if the transportation provider were able to travel along a route for the Haversine distance. For example, the average travel speed may be based on an average speed limit for roads that may be traveled for the transportation provider to reach the pickup location.

Travel progression 620 shows little to no movement of the transportation provider towards the pickup location (decrease in distance between the starting location of the transportation provider and the pickup location) as the travel time increases. Travel progression 622 shows movement of the transportation provider away from the pickup location (an increase in distance between the starting location of the transportation provider and the pickup location) as the travel time increases.

An actual travel progression 602 shows the actual progression of the transportation provider towards the pickup location. Referring to FIGS. 4 and 5, the cancellation module 410 may receive travel progress information and data from the progress monitoring module 416. The cancellation module 410 may calculate an area under a curve using the predetermined travel progression 610 and an area under a curve using the actual travel progression 602 for one or more times since the matching of the transportation provider to the transportation requestor (one or more travel times). The dynamic transportation matching system 402 may track a distance to the pickup location as a function of time (travel time) since the matching of the transportation provider to the transportation requestor. The dynamic transportation matching system 402 may track the distance in real time. In some cases, the cancellation module 410 may use the calculated area under each curve to determine a progress of the transportation provider to the pickup location. The cancellation module 410 may compare the progress to a predetermined threshold (e.g., a predetermined acceptable progress) to determine if the transportation provider is making adequate progress towards the pickup location. As described herein, the cancellation module 410 may access the model repository 420 and may use one or more trained models when determining if the transportation provider is making adequate progress towards the pickup location and if not, if the matching of the transportation provider to the transportation requestor should be cancelled.

Referring to the example graph 600, for example, the cancellation module 410 may calculate an area under the curve for the predetermined travel progress (predetermined area 612) based on either a selected time (e.g., time 608) or a selected distance (e.g., distance 614). The cancellation module 410 may calculate an area under the curve for the predetermined travel progress (predetermined area 612) at the time 608 (e.g., 100 seconds) (and at the distance 614 (e.g., 1500 meters)) since the matching of the transportation provider to the transportation requestor. The cancellation module 410 may calculate the area under the curve based on the predetermined travel progress 610 indicating that at the time 608 the transportation provider, if traveling at the predetermined average travel speed, would have traveled the distance 614. The cancellation module 410 may then calculate a total area under the curve for the actual travel progress, which would include the predetermined area 612 and a delta actual area 616 at the selected time 608. The cancellation module 410 may subtract the predetermined area 612 from the total area under the curve for the actual travel progress to determine the delta actual area 616. The cancellation module 410 may use the delta actual area 616 to determine if the transportation provider is making acceptable progress towards the pickup location.

For example, the cancellation module 410 may use Expression 2 to determine the progress of the transportation provider to the pickup location from a selected distance. Referring to FIG. 6A, the area under the curve of an actual travel progression from an initial travel distance to a selected travel distance for the measurement of the distance traveled verses time can be used along with the area under the curve of a predetermined travel progression from the initial travel distance to the selected travel distance to determine a progress of the transportation provider to the pickup location. For example, the area under the curve of the actual travel progression 602 from an initial travel distance (e.g., distance 606) to a selected travel distance (e.g., distance=614) (e.g., delta actual area 616) can be used along with the area under the curve of the predetermined travel progression 610 from the initial travel distance, (e.g., distance 606), to the selected travel distance (e.g., distance 614 at travel time 608), (e.g., predetermined area 612) to determine the progress of the transportation provider to the pickup location after the passing of the travel time 608. Dividing a delta of an actual area (e.g., the area under the curve of the actual travel progression from the initial travel distance to the selected travel distance minus the area under the curve of the predetermined travel progression from the initial travel distance to the selected travel distance (e.g., delta actual area 616)) by the predetermined area ((e.g., the area under the curve of the predetermined travel progression from the initial travel distance to the selected travel distance (e.g., the predetermined area 612)) results in an area under the curve percentage difference between the delta actual area 616 and the predetermined area 612 as shown by Expression 2.

$$\text{AucDiffPct[Distance]}_{S,T} = \Delta \text{Area}_{S,T}/\text{Predetermined Area}_{S,T} \quad (2)$$

where: (i) $\Delta\text{Area}_{S,T}$ is the delta actual area 616, (ii) Predetermined $\text{Area}_{S,T}$ is the predetermined area 612, (iii) s is an initial travel time (in the example shown in FIG. 6A, S=0), and (iv) T is the selected time for the measurement (in the example shown in FIG. 6A, T=100 seconds).

For example, $\text{AucDiffPct[Distance]}_{S,T} > 1.0$ may indicate that the transportation provider is traveling off-route. For example, the transportation provider may be traveling away from the pickup location (e.g., the actual travel progression may be along or closer to the travel progression 622).

For example, $\text{AucDiffPct[Distance]}_{S,T} = 1.0$ may indicate that the transportation provider is making no progress towards the pickup location (not moving). For example, the transportation provider may be making little to no progress towards the pickup location (e.g., the actual travel progression may be along or closer to the travel progression 620).

For example, $\text{AucDiffPct[Distance]}_{S,T} < 1.0$ may indicate that the transportation provider is making adequate progress towards the pickup location. For example, the actual travel progression may be along or close to the predetermined travel progress 610.

Referring to FIGS. 1A-B, 2A-B, 3A-B, and FIG. 6B, a predetermined travel progression 660 shows an ETA to the pickup location linearly decreasing as the time since the matching of a transportation provider to a transportation requestor increases. The predetermined travel progression 660 may be based on a Haversine distance between the starting location of the transportation provider and the pickup location. For example, a dynamic transportation matching system (e.g., the dynamic transportation matching system 402 as shown in FIG. 4) matches a transportation provider with a transportation requestor. The dynamic transportation matching system may determine that an ETA from the starting location of the transportation provider to the pickup location, based on a Haversine distance, is ETA 656 (e.g., 250 seconds).

Travel progression 670 shows little to no movement of the transportation provider towards the pickup location (decrease in the ETA) as the travel time increases. Travel progression 622 shows movement of the transportation provider away from the pickup location (an increase in the ETA) as the travel time increases.

An actual travel progression 652 shows the actual progression of the transportation provider towards the pickup location. Referring to FIGS. 4 and 5, the cancellation module 410 may receive travel progress information and data from the progress monitoring module 416. The cancellation module 410 may calculate an area under a curve using the predetermined travel progression 660 and an area under a curve using the actual travel progression 652 for one or more times since the matching of the transportation provider to the transportation requestor (one or more travel times). The dynamic transportation matching system 402 may track an ETA to the pickup location as a function of time (travel time) since the matching of the transportation provider to the transportation requestor. The dynamic transportation matching system 402 may track the ETA in real time. In some cases, the cancellation module 410 may use the calculated area under each curve to determine a progress of the transportation provider to the pickup location. The cancellation module 410 may compare the progress to a predetermined threshold (e.g., a predetermined acceptable progress) to determine if the transportation provider is making adequate progress towards the pickup location. As described herein, the cancellation module 410 may access the model repository 420 and may use one or more trained models when determining if the transportation provider is making adequate progress towards the pickup location and if not, if the matching of the transportation provider to the transportation requestor should be cancelled.

Referring to the example graph 650, for example, the cancellation module 410 may calculate an area under the curve for the predetermined travel progress (predetermined area 662) based on either a selected time (e.g., time 658) or a selected ETA (e.g., ETA 664). The cancellation module 410 may calculate an area under the curve for the predetermined travel progress (predetermined area 662) at the time 658 (e.g., 100 seconds) (and at the ETA 664 (e.g., 150 seconds)) since the matching of the transportation provider to the transportation requestor. The cancellation module 410 may calculate the area under the curve based on the predetermined travel progress 660 indicating that at the time 658 the ETA of the transportation provider would have changed to the ETA 664. The cancellation module 410 may then calculate a total area under the curve for the actual travel progress, which would include the predetermined area 662 and a delta actual area 666 at the selected time 658. The cancellation module 410 may subtract the predetermined area 662 from the total area under the curve for the actual travel progress to determine the delta actual area 666. The cancellation module 410 may use the delta actual area 666 to determine if the transportation provider is making acceptable progress towards the pickup location.

For example, the cancellation module 410 may use Expression 3 to determine the progress of the transportation provider to the pickup location from a selected ETA. Referring to FIG. 6B, the area under the curve of an actual travel progression from an initial ETA to a selected ETA for the measurement of the distance traveled verses time can be used along with the area under the curve of a predetermined travel progression from the initial ETA to the selected ETA to determine a progress of the transportation provider to the pickup location. For example, the area under the curve of the actual travel progression 652 from an initial ETA (e.g., ETA 656) to a selected ETA (e.g., ETA 664 at travel time 658) (e.g., delta actual area 666) can be used along with the area under the curve of the predetermined travel progression 660 from the initial ETA, (e.g., ETA 656), to the selected ETA (e.g., ETA 664 at travel time 656), (e.g., predetermined area 662) to determine the progress of the transportation provider to the pickup location. 614 after the passing of the travel time 658. Dividing a delta of an actual area (e.g., the area under the curve of the actual travel progression from the initial ETA to the selected ETA minus the area under the curve of the predetermined travel progression from the initial ETA to the selected ETA (e.g., delta actual area 666)) by the predetermined area ((e.g., the area under the curve of the predetermined travel progression from the initial ETA to the selected ETA (e.g., the predetermined area 662)) results in an area under the curve percentage difference between the delta actual area 666 and the predetermined area 662 as shown by Expression 3.

$$\text{AucDiffPct}[\text{Time}]_{S,T} = \Delta\text{Area}_{S,T}/\text{Predetermined Area}_{S,T} \quad (3)$$

where: (i) $\Delta\text{Area}_{S,T}$ is the delta actual area 666, (ii) Predetermined $\text{Area}_{S,T}$ is the predetermined area 662, (iiI) s is an initial travel time (in the example shown in FIG. 6B, S=0), and (iv) T is the selected time for the measurement (in the example shown in FIG. 6B, T=100 seconds).

For example, $\text{AucDiffPct}[\text{Time}]_{S,T} > 1.0$ may indicate that the transportation provider is traveling off-route. For example, the transportation provider may be traveling away from the pickup location (e.g., the actual travel progression may be along or closer to the travel progression 672).

For example, $\text{AucDiffPct}[\text{Time}]_{S,T} = 1.0$ may indicate that the transportation provider is making no progress towards the pickup location (not moving). For example, the transportation provider may be making little to no progress towards the pickup location (e.g., the actual travel progression may be along or closer to the travel progression 670).

For example, $\text{AucDiffPct}[\text{Time}]_{S,T} < 1.0$ may indicate that the transportation provider is making adequate progress towards the pickup location. For example, the actual travel progression may be along or close to the predetermined travel progress 660.

In addition, or in the alternative, the cancellation module 410 may use one or more of the following expressions when determining a progress of a transportation provider to a pickup location.

An initial time and a travel time later then the initial time (e.g., a subsequent travel time) can be determined. The cancellation module 410 can determine an ETA for the provider to the pickup location at the initial time. The cancellation module 410 can determine an ETA for the provider to the pickup location at the subsequent time. The cancellation module can calculate a percentage difference in the ETA between the initial time and the subsequent time by subtracting the ETA for the subsequent time from the ETA of the initial time and then dividing the difference by the ETA of the subsequent time. The cancellation module 410 may use Expression 4 to calculate an ETA percentage difference between an ETA for a transportation provider as determined for an initial location and an ETA as determined for a subsequent location.

$$\text{EtaDiffPct}_{S,T} = (\text{EtaSec}_T - \text{EtaSec}_S)/\text{EtaSec}_S \quad (4)$$

where (i) S an initial time, (ii) T is a travel time greater than the initial time S, (iii) $\text{EtaSec}_T$ is the ETA at the travel time T, and (iv) $\text{EtaSec}_S$ is the ETA at the initial time S. For example, the initial time S may be equal to a travel time of zero at the start of the travel of the transportation provider to the pickup location. In another example, the initial time S may be a travel time along the travel route from the starting location of the transportation provider to the pickup location that is less than the travel time T.

An initial time and a travel time later then the initial time (e.g., a subsequent travel time) can be determined. The cancellation module 410 can determine an ETA for the provider to the pickup location at the initial time. The cancellation module 410 can determine an ETA for the provider to the pickup location at the subsequent time. The cancellation module can calculate a percentage difference in the seconds to arrival at the pickup location between the initial time and the subsequent time by subtracting the sum of the ETA for the initial time with the initial time from the sum of the ETA for the subsequent time with the subsequent time and dividing the result by the sum of the ETA for the initial time with the initial time. The cancellation module 410 may use Expression 5 to calculate a seconds-to-arrival percentage difference between an ETA for a transportation provider as determined for an initial location and an ETA as determined for a subsequent location.

$$\text{SecondsToArrivalDiffPct}_{S,T} = [(\text{EtaSec}_T + T) - (\text{EtaSec}_S + S)]/(\text{EtaSec}_S + S) \quad (5)$$

where (i) S an initial time, (ii) T is a travel time greater than the initial time S, (iii) $\text{EtaSec}_T$ is the ETA at the travel time T, and (iv) $\text{EtaSec}_S$ is the ETA at the initial time S. For example, the initial time S may be equal to a travel time of zero at the start of the travel of the transportation provider to the pickup location. In another example, the initial time S may be a travel time along the travel route from the starting location of the transportation provider to the pickup location that is less than the travel time T.

The cancellation module may use road distance or a Haversine distance when using Expressions 6-12.

An initial time and a travel time later then the initial time (e.g., a subsequent travel time) can be determined. The cancellation module 410 can determine a distance of the provider from the pickup location at the initial time. The cancellation module 410 can determine a distance of the provider from the pickup location at the subsequent time. The cancellation module can calculate a percentage difference in the distance of the provider to the pickup location between the initial time and the subsequent time by subtracting the distance of the provider from the pickup location at the initial time from the distance of the provider from the pickup location at the subsequent time and dividing the result by the distance of the provider from the pickup location at the initial time. The cancellation module 410 may use Expression 6 to calculate a distance to the pickup location percentage difference between a distance to the pickup location as determined for an initial location of a transportation provider and a distance to the pickup location as determined for a subsequent location of the transportation provider.

$$\text{DistanceToPickupDiffPct}_{S,T} = (\text{DistanceToPickup}_T - \text{DistanceToPickup}_S)/\text{DistanceToPickup}_S \quad (6)$$

where (i) S an initial time, (ii) T is a travel time greater than the initial time S, (iii) $\text{DistanceToPickup}_T$ is the distance to the pickup location from the travel time T, and (iv) $\text{DistanceToPickup}_S$ is the distance to the pickup location from the initial time S. For example, the initial time S may be equal to a travel time of zero at the start of the travel of the transportation provider to the pickup location. In another example, the initial time S may be a travel time along the travel route from the starting location of the transportation provider to the pickup location that is less than the travel time T.

An initial time and a travel time later then the initial time (e.g., a subsequent travel time) can be determined. The cancellation module 410 can determine a distance of the provider from the pickup location at the initial time and a location of the provider at the initial time. The cancellation module 410 can determine a distance traveled by the provider from an initial location at the initial time to a subsequent location at the subsequent time. The cancellation module 410 can determine a road distance traveled of the provider as an actual road distance (e.g., in miles) to the pickup location from a location of the provider at the initial time The cancellation module can calculate a percentage difference traveled between the initial time and the subsequent time by subtracting the distance traveled by the provider from the initial location at the initial time to the subsequent location at the subsequent time from the distance of the provider from the pickup location at the initial time and dividing the result by the actual road distance. The cancellation module 410 may use Expression 7 to calculate a distance traveled percentage difference between a distance to the pickup location as determined for a subsequent location of a transportation provider and a distance traveled from an initial location of the transportation provider to the subsequent location of the transportation provider.

$$\text{DistanceTraveledDiffPct}_{S,T} = (\text{DistanceToPickup}_S - \text{DistanceTraveled}_T)/\text{RoadDistanceMiles}_S \quad (7)$$

where (i) S an initial time, (ii) T is a travel time greater than the initial time S, (iii) $\text{DistanceToPickup}_S$ is the distance to the pickup location from the location of the transportation provider at the initial time S, (iv) $\text{DistanceTraveled}_T$ is the distance traveled from the initial location of the transportation provider to the subsequent location of the transportation provider at the travel time T, and (v) $\text{RoadDistanceMiles}_S$ is the actual road distance to the pickup location from the location of the transportation provider at the initial time S. For example, the initial time S may be equal to a travel time of zero at the start of the travel of the transportation provider to the pickup location. In another example, the initial time S may be a travel time along the travel route from the starting location of the transportation provider to the pickup location that is less than the travel time T.

An initial time and a travel time later then the initial time (e.g., a subsequent travel time) can be determined. The cancellation module 410 can determine a distance of the provider from the pickup location at the initial time and an ETA of the provider to the pickup location at the initial time. The cancellation module 410 can determine an average predicted speed of the provider by dividing the distance of the provider from the pickup location at the initial time by the ETA of the provider to the pickup location at the initial time. The cancellation module 410 may use Expression 8 to calculate a predicted average speed for a transportation provider.

$$\text{AverageSpeedPredicted}_S = \text{DistanceToPickup}_S/\text{EtaSec}_S \quad (8)$$

where (i) S an initial time, (ii) $\text{DistanceToPickup}_S$ is the distance to the pickup location from the location of the transportation provider at the initial time S, and (iii) $\text{EtaSec}_S$ is the ETA at the initial time S. For example, the initial time S may be equal to a travel time of zero at the start of the travel of the transportation provider to the pickup location. In another example, the initial time S may be a travel time along the travel route from the starting location of the transportation provider to the pickup location that is less than the travel time T.

In some examples, the cancellation module 410 may determine an initial location and a current (or subsequent) location of a provider at an initial time and a time later than the initial time (e.g., a subsequent time), respectively, the time between the initial time and the subsequent time being a travel time. The cancellation module 410 may determine a distance traveled by the provider from the initial location to the current location. The cancellation module 410 may determine an average actual speed of the provider by dividing the distance traveled by the provider from the initial location to the current location by the travel time. For example, the cancellation module 410 may use Expression 9 to calculate an actual average speed for a transportation provider.

$$\text{AverageSpeedActual}_T = \text{DistanceTraveled}_T/T \quad (9)$$

where (i) Ta travel time, and (ii) $\text{DistanceTraveled}_T$ is the distance traveled by the transportation provider from an initial location to a current location of the transportation provider at the travel time T.

In some examples, the cancellation module 410 may determine an initial location and a current (or subsequent) location of a provider at an initial time and a time later than the initial time (e.g., a subsequent time), respectively, the time between the initial time and the subsequent time being a travel time. The cancellation module 410 may calculate a distance traveled by the provider from the initial location to the current location. The cancellation module 410 may determine a movement ratio for the provider by dividing the distance traveled by the provider from the initial location to the current location by the average predicted speed of the provider average predicted speed of the provider as discussed with reference to Expression 8. By way of example, cancellation module 410 may use Expression 10 to calculate a movement ratio for a transportation provider.

$$MovementRatio_{ST} = DistanceTraveled_T / T*SpeedAvgPredicted_S \quad (10)$$

where (i) S an initial time, (ii) T is a travel time greater than the initial time S, (iii) DistanceTraveled$_T$ is the distance traveled by the transportation provider from an initial location at the initial time S to a current location of the transportation provider at the travel time T, and (iv) AverageSpeedPredicted$_S$ was calculated in Expression 8. For example, the initial time S may be equal to a travel time of zero at the start of the travel of the transportation provider to the pickup location. In another example, the initial time S may be a travel time along the travel route from the starting location of the transportation provider to the pickup location that is less than the travel time T.

In some examples, cancellation module 410 may determine an initial location and a current (or subsequent) location of a provider at an initial time and a time later than the initial time (e.g., a subsequent time), respectively, the time between the initial time and the subsequent time being a travel time. The cancellation module 410 can calculate an average speed difference percentage for the provider by using Expression 8 to calculate an average predicted speed of the provider for the travel time and by using Expression 9 to calculate the actual average speed for the provider for the travel time. The cancellation module 410 can calculate the average speed difference percentage for the provider by subtracting the average predicted speed of the provider for the travel time from the actual average speed for the provider for the travel time and dividing the result by the average predicted speed of the provider for the travel time. By way of example, cancellation module 410 may use Expression 11 to calculate an average speed differential percentage for a transportation provider.

$$AvgerageSpeedDiffPct_{ST} = (AverageSpeedActual_T - AverageSpeedPredicted_S)/AverageSpeedPredicted_S \quad (11)$$

where (i) AverageSpeedActual$_T$ is calculated using Expression 9, and (ii) AverageSpeedPredicted$_S$ is calculated using Expression 8.

In some implementations, the expressions recited herein (e.g., in particular Expressions 4-11) may be calculated based on the initial time S being at the start of the matching of the transportation requestor with a transportation provider (e.g., the start of the travel from a starting location of the transportation provider to the transportation requestor). Predictions based on the initial time S being from the start of the travel from a starting location of the transportation provider may use full driver location history (e.g., driver location history from the starting location to a current location based on travel time and/or travel distance from the starting location).

In some implementations, the expressions recited herein (e.g., in particular Expressions 4-11) may be calculated based on the initial time S being after the start of the travel from a starting location of the transportation provider to the transportation requestor but before arrival of the transportation provider to the pickup location. Predictions based on the initial time S being from a time after the start of the travel may use incremental or short driver location history (e.g., driver location history from a previous location to a current location based on travel time and/or travel distance between the locations).

In addition, or in the alternative, referring to FIGS. 4 and 5, the machine learning module 406 may access data related to completed transportation requests from the data repository 418. The machine learning module 406 may use the expressions described herein to train models for use in predicting bail-out eligible matches between a transportation provider and a transportation requestor. For example, the machine learning module 406 may train models using full driver location history data. In another example, the machine learning module may train models using short driver location history. The use of short driver location history may include time slice data. For example, transportation data for a transportation request may be included in the data repository as multiple overlapping time slices. The transportation data included in each time slice may be data gathered about the progress of the transportation provider towards the pickup location in order to complete a transportation request that may be taken at a particular time interval (e.g., every 10 seconds, every 30 seconds, every 60 seconds). In some cases, the time interval may be based on the predetermined ETA for the transportation request. For example, the longer the ETA the larger the time interval. In some cases, multiple (more than one) location for a transportation provider may be included in a time slice. Examples of overlapping time slices taken at a 30 second interval may be (i) Timeslice$_{30}$ that may include location data for a transportation provider taken during the first 30 seconds of travel; (ii) Timeslice$_{60}$ that may include location data for a transportation provider taken during the first 60 seconds of travel, where the first 30 seconds of travel data overlaps with the data included in Timeslice$_{30}$; and (iii) Timeslice$_{90}$ that may include location data for a transportation provider taken during the first 90 seconds of travel, where the first 60 seconds of travel data overlaps with the data included in Timeslice$_{60}$. Additional time slices based on a 30 second interval may be taken until the either the transportation provider reaches the pickup location or until an ETA is reached.

Figure 7:
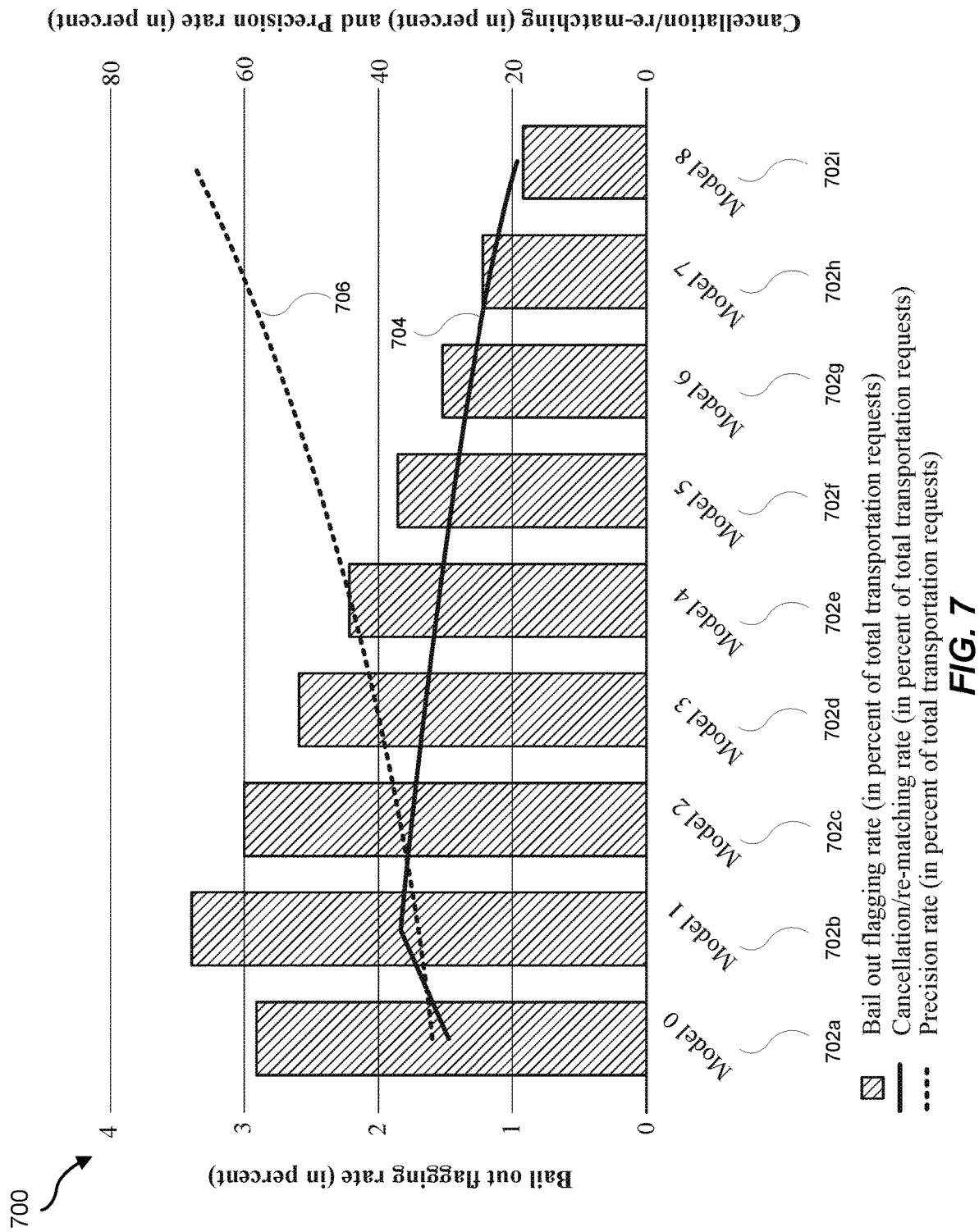
FIG. 7 is an example graph showing improvements in a precision for predicting bail-out eligible matches between a transportation requestor and a transportation provider.

FIG. 7 is an example graph 700 showing improvements in a precision for predicting bail-out eligible matches between a transportation requestor and a transportation provider. The improvements may result in reduced cancellations by transportation requestors resulting in higher satisfaction and more completed transportation requests because if a matching between a transportation provider and a transportation requestor may be flagged as bail-out eligible before cancellation by a transportation requestor, the transportation requestor may be re-matched with another transportation provider and the transportation request may be completed.

Referring to FIGS. 4 and 5, the example graph 700 shows a bail out flagging rate in percent of total transportation requests for various models (e.g., models 702a-i) included in the model repository 420. The example graph 700 shows an actual cancellation/re-matching rate 704 in percent of total transportation requests. The example graph 700 shows a precision rate 706 in percent of transportation requests for a bail out of transportation providers with transportation requestors that are considered beneficial or successful. In general, the example graph 700 shows that as model learning improves, the bail out flagging rate in percent of total transportation requests decreases and the actual cancellation/re-matching rate 704 decreases but not necessarily in proportion to the decreases in the bail out flagging rate. This is also shown by the increase in the precision rate 706 as the bail out flagging rate in percent of total transportation requests decreases, and the actual cancellation/re-matching rate 704 in percent of total transportation requests increases.

Figure 8:
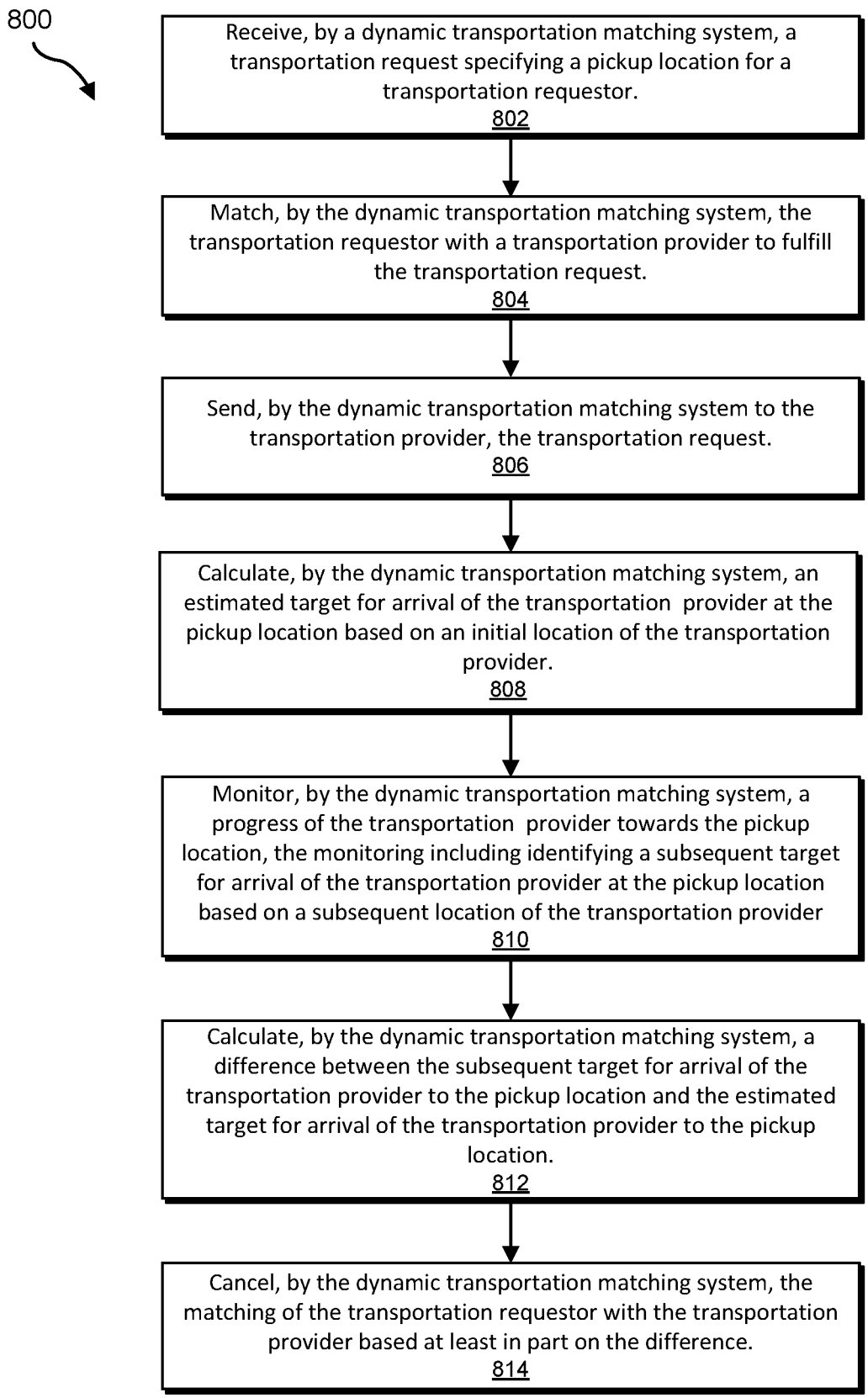
FIG. 8 is a flow diagram of an example method for determining that a match is eligible for a bail out.

FIG. 8 is a flow diagram of an example computer-implemented method 800 for determining that a match is eligible for a bail out. The steps shown in FIG. 8 may be performed by any suitable computer-executable code and/or computing system, including the system(s) illustrated in FIGS. 4 and 5. In one example, each of the steps shown in FIG. 8 may represent an algorithm whose structure includes and/or is represented by multiple sub-steps, examples of which will be provided in greater detail below.

As illustrated in FIG. 8, at step 802 one or more of the systems described herein may receive, by a dynamic transportation matching system from a computing device of a requestor, a request for transportation specifying a pickup location for a requestor. For example, the request module 412 may receive the request for transportation. The systems described herein may perform step 802 in a variety of ways. In one example, the request module 412 included in the dynamic transportation matching system 402 may receive the transportation request 422 from the transportation requestor computing device 430 by way of the network 528.

At step 804 one or more of the systems described herein may match, by the dynamic transportation matching system, the requestor with a provider for completion of the request. For example, the matching module 414 may match the requestor with a provider to start the process of completing the request. The systems described herein may perform step 804 in a variety of ways. In one example, the matching module 414 included in the in the dynamic transportation matching system 402 may identify a provider (e.g., transportation provider 454) using location data obtained from location services module 906. Ride services module 908 may use the location data to identify transportation providers who are geographically close to the transportation requestor (e.g., within a certain threshold distance or travel time) and/or who may be otherwise a good match with the transportation requestor.

At step 806 one or more of the systems described herein may send, by the dynamic transportation matching system to a computing device of the provider, the request for transportation. For example, the transportation provider computing device 434 may receive the request. The systems described herein may perform step 806 in a variety of ways. In one example, the matching module 414 may send the match 428 to the transportation provider computing device 434 as a transportation request for the transportation provider 454.

At step 808 one or more of the systems described herein may calculate, by the dynamic transportation matching system, an estimated target for arrival of the provider at the pickup location based on an initial location of the provider. For example, the cancellation module 410 may perform the calculation of the estimated target for arrival. The systems described herein may perform step 808 in a variety of ways. In one example, the progress monitoring module 416 receives location information and data from the transportation provider 454. In some scenarios, the location information and data may be for a starting location for the transportation provider 454. In some scenarios, the location information and data may be for an initial location of the transportation provider 454 that may not be the starting location. The progress monitoring module 416 provides the location information and data to the cancellation module 410 for use in the calculation of the estimated target for arrival of the transportation provider.

At step 810 one or more of the systems described herein may monitor, by the dynamic transportation matching system, a progress of the provider towards the pickup location, the monitoring including identifying a subsequent target for arrival of the provider at the pickup location based on a subsequent location of the provider. For example, the progress monitoring module 416 may receive location information and data for the transportation provider 454 on a regular basis (e.g., every 10 seconds, every 30 seconds, every minute). The systems described herein may perform step 810 in a variety of ways. In one example, the progress monitoring module 416 provides the location and information data to the cancellation module 410. The cancellation module 410 may use the location information and data to identify the subsequent target for arrival.

At step 812 one or more of the systems described herein may calculate, by the dynamic transportation matching system, a difference between the subsequent target for arrival of the provider to the pickup location and the estimated target for arrival of the provider to the pickup location. The systems described herein may perform step 812 in a variety of ways. For example, the cancellation module 410 may calculate the difference between the subsequent target for arrival and the estimated target for arrival.

At step 814 one or more of the systems described herein may cancel, by the dynamic transportation matching system, the matching of the requestor with the provider based at least in part on the difference. For example, the cancellation module 410 may cancel the transportation request by sending a cancel 426 to the transportation provider computing device 434. The systems described herein may perform step 814 in a variety of ways. In one example, the cancelling of the transportation request by the cancellation module 410 may be based on one or more factors.

In some examples, cancelling the matching of the requestor with the provider may be based, at least in part, on a comparison of the calculated difference between the subsequent target for arrival of the provider to the pickup location and the estimated target for arrival of the provider to the pickup location to a threshold value.

In some examples, the dynamic transportation matching system when monitoring the progress of the provider towards the pickup location may include identifying a plurality of subsequent targets for arrival of the provider at the pickup location. Each of the plurality of subsequent targets may be associated with a respective subsequent location of the provider.

In some examples, the threshold value that is compared to the calculated difference between the subsequent target for arrival of the provider to the pickup location and the estimated target for arrival of the provider to the pickup location may be based, at least in part, on a predicted progress value at a particular respective subsequent location of the provider relative to the initial location of the provider.

In some examples, calculating the difference between the subsequent target for arrival of the provider to the pickup location and the estimated target for arrival of the provider to the pickup location may be based, at least in part, on an observed value at the subsequent location of the provider.

In some examples, the threshold value that is compared to the calculated difference between the subsequent target for arrival of the provider to the pickup location and the estimated target for arrival of the provider to the pickup location may be based, at least in part, on a predicted progress value at a particular respective subsequent location of the provider relative to a previous respective subsequent location of the provider.

In some examples, calculating a difference between the subsequent target for arrival of the provider to the pickup location and the estimated target for arrival of the provider to the pickup location may be based, at least in part, on an observed value at the subsequent location of the provider and an observed value at the previous subsequent location of the provider.

In some examples, the method described with reference to FIG. 8 may further include the dynamic transportation matching system generating a data-driven model based on machine learning and accessing the data-driven model to determine the threshold value.

In some examples, the threshold value may be tuned based on at least one factor that is related to the progress of the provider towards the pickup location and on at least one external factor not related to the progress of the provider towards the pickup location.

In some examples, the method described with reference to FIG. 8 may further include the dynamic transportation matching system calculating a first probability for the cancellation of the matching of the requestor with the provider based on the at least one external factor not related to the progress of the transportation provider towards the pickup location, calculating a second probability for the cancellation of the matching of the requestor with the provider based on the at least one factor that is related to the progress of the transportation provider towards the pickup location and based on the at least one external factor not related to the progress of the transportation provider towards the pickup location, calculating a difference between the second probability and the first probability, and determining that the cancelling of the matching of the requestor with the provider is based on the progress of the provider towards the pickup location based on comparing the difference to the threshold value.

In some examples, the method described with reference to FIG. 8 may further include the dynamic transportation matching system generating a plurality of data-driven models based on machine learning. Each of the plurality of data-driven models may be associated with a respective geographic cluster.

In some examples, the method described with reference to FIG. 8 may further include the dynamic transportation matching system determining that that the pickup location is part of a particular geographic cluster.

In some examples, the method described with reference to FIG. 8 may further include the dynamic transportation matching system accessing the data-driven model associated with the particular geographic cluster to determine the threshold value.

In some examples, the dynamic transportation matching system calculating the estimated target for arrival of the provider at the pickup location may include calculating an estimated time of arrival (ETA) of the provider at the pickup location.

In some examples, the dynamic transportation matching system when identifying the subsequent target for arrival of the provider at the pickup location may include calculating a subsequent ETA of the provider at the pickup location.

In some examples, the dynamic transportation matching system when calculating the difference between the subsequent target and the estimated target may include calculating the difference between the estimated ETA and the subsequent ETA.

In some examples, the dynamic transportation matching system when calculating the estimated target for arrival of the provider at the pickup location may use a Haversine formula.

In some examples, the dynamic transportation matching system when calculating the estimated target for arrival of the provider at the pickup location may use a road distance.

In some examples, the dynamic transportation matching system when monitoring the progress of the provider towards the pickup location may determine that the provider is not moving.

In some examples, the dynamic transportation matching system when monitoring the progress of the provider towards the pickup location may determine that the provider is moving away from the pickup location.

In some examples, the dynamic transportation matching system when monitoring the progress of the provider towards the pickup location may determine that the provider is moving at a slower than predicted rate.

In some examples, the method described with reference to FIG. 8 may further include the dynamic transportation matching system associating the cancellation of the matching of the requestor to the provider with the provider and not with the requestor. The associating may impact at least one performance rating associated with the provider.

In some examples, the method described with reference to FIG. 8 may further include the dynamic transportation matching system receiving, from the computing device of the requestor, a request to cancel the matching of the requestor with the provider, cancelling the matching of the requestor with the provider based at least in part on the request, and associating the cancellation of the matching of the requestor to the provider with the requestor instead of with the provider.

In some examples, cancelling the matching of the transportation requestor with the transportation provider may be further based on the dynamic transportation matching system determining that a different provider is available for matching with the requestor.

In some examples, the method described with reference to FIG. 8 may further include the dynamic transportation matching system, subsequent to cancelling the matching of the requestor with the provider, matching the requestor with the different provider in order to complete the transportation request.

In some examples, a corresponding system for determining that a match is eligible for a bail out may include one or more physical processors and one or more memories coupled to one or more of the physical processors, the one or more memories including instructions operable when executed by the one or more physical processors to cause the system to perform operations including: (i) receiving, by a dynamic transportation matching system from a computing device of a requestor, a request for transportation specifying a pickup location for the requestor, (ii) matching, by the dynamic transportation matching system, the requestor with a provider to for completion of the request, (iii) sending, by the dynamic transportation matching system to a computing device of the provider, the request for transportation, (iv) calculating, by the dynamic transportation matching system, an estimated target for arrival of the provider at the pickup location based on an initial location of the provider, (v) monitoring, by the dynamic transportation matching system, a progress of the provider towards the pickup location, the monitoring including identifying a subsequent target for arrival of the provider at the pickup location based on a subsequent location of the provider, (vi) calculating, by the dynamic transportation matching system, a difference between the subsequent target for arrival of the provider to the pickup location and the estimated target for arrival of the provider to the pickup location, and (vii) cancelling, by the dynamic transportation matching system, the matching of the requestor with the provider based at least in part on the difference.

A corresponding non-transitory computer-readable storage medium may include computer-readable instructions that, when executed by at least one processor of a computing device, cause the computing device to (i) receive, by a dynamic transportation matching system from a computing device of a requestor, a request for transportation specifying a pickup location for the requestor, (ii) match, by the dynamic transportation matching system, the requestor with a provider to for completion of the request for transportation, (iii) send, by the dynamic transportation matching system to a computing device of the provider, the request for transportation, (iv) calculate, by the dynamic transportation matching system, an estimated target for arrival of the provider at the pickup location based on an initial location of the provider, (v) monitor, by the dynamic transportation matching system, a progress of the provider towards the pickup location, the monitoring including identifying a subsequent target for arrival of the provider at the pickup location based on a subsequent location of the provider, (vi) calculate, by the dynamic transportation matching system, a difference between the subsequent target for arrival of the provider to the pickup location and the estimated target for arrival of the provider to the pickup location, and (vii) cancel, by the dynamic transportation matching system, the matching of the requestor with the provider based at least in part on the difference.

In some examples, a dynamic transportation matching system may track failed matches (e.g., matches which do not result in the transportation provider providing transportation to the transportation requestor). Furthermore, in some examples, the dynamic transportation matching system may determine the cause of match failures. For example, the dynamic transportation matching system may determine whether the transportation provider canceled the match, failed to meet the transportation requestor, and/or contributed to the transportation requestor canceling the match (by, e.g., failing to make adequate progress toward the transportation requestor). In some examples, the dynamic transportation matching system may make matching decisions based at least in part on the determined causes of past failed matches. For example, the dynamic transportation matching system may determine, based on one or more past failed matches, that a prospective match is at risk of failure (e.g., the failure being caused by the transportation provider) and, therefore, may decline to make the prospective match. Match failures may adversely affect the experience of transportation requestors, potentially resulting in future lost transportation requests. However, if the transportation requestor cancels the transportation request the transportation service may still collect cancellation fees. In some situations, once a match is made, the transportation provider may have difficulty reaching the pickup location for the transportation request by an estimated time of arrival (ETA). The transportation requestor may subsequently cancel the transportation request based on the lack of progress being made to arrive at the pickup location by the ETA. For example, the transportation provider may remain in a fixed location. In another example, the transportation provider may take a route that drives away from the pickup location as opposed to driving towards the pickup location.

As described herein, a dynamic transportation matching system may provide a "bail-out" feature, which may also be referred to herein as a cancellation feature, that identifies matchings of transportation providers to transportation requestors that may be eligible for cancellation. The dynamic transportation matching system may identify these matchings using a data-driven model based on machine learning. The machine learning may include data related to matchings of transportation providers to transportation requestors that have been cancelled. The dynamic transportation matching system may store the data in the data-driven model and may use the data to calculate a probability or likelihood for cancellation of a specific matching of a transportation provider to a transportation requestor.

Based on the calculated probability, the specific matching of the transportation provider to the transportation requestor may be marked or flagged as a bail-out eligible match. The dynamic transportation matching system may cancel the bail-out eligible match and then may match the same transportation request to another transportation provider without penalty to the transportation requestor and without benefit to the transportation service.

In some implementations, the dynamic transportation matching system using the data-driven model may identify a false positive (e.g., may erroneously identify a bail-out eligible match). For example, a bail-out eligible match may be erroneously identified when the transportation provider matched with the transportation requestor is making little to no progress in reaching the pickup location for the transportation request by an estimated time of arrival (ETA) because the transportation provider is stuck in traffic. In another example, a bail-out eligible match may be erroneously identified when the transportation provider matched with the transportation requestor needs to follow a detour in the route to the pickup location for the transportation request because it may appear that the transportation provider at times is driving away from the pickup location and/or is off the pickup route.

In some implementations, the dynamic transportation matching system using the data-driven model may identify a false negative (e.g., may not identify a bail-out eligible match). Too many false positives may adversely cancel and cause the transportation requestor to be matched with another transportation provider with little to any improvement in the arrival time to the pickup location while too many false negatives may result in an increase the cancellation of transportation requests by the transportation requestors.

The use of machine learning when creating and maintaining the data-driven model may result in a model that may analyze scenarios that resulted in transportation cancellations by transportation requestors to improve a decision accuracy for determining if a match should be bailed out. For example, the dynamic transportation matching system when using the data-driven model may predict a cancellation of a match based on features associated with the progress of a transportation provider towards the pickup location. For example, these features may include but are not limited to, the ETA of the transportation provider towards the pickup location over time, the street distance traveled by the transportation provider towards the pickup location over time, and the street distance traveled by the transportation provider towards the pickup location over time as compared to a Haversine distance between the transportation provider and the pickup location.

In addition, in some implementations, the machine learning when creating and maintaining the data-driven model may consider other features or attributes that may contribute to the cancellation of a match that may not be related to a progress of a transportation provider towards the pickup location. For example, a cancellation rate may be identified for a geohash included in a geographic cluster (e.g., a geographic region). The geographic cluster may include many one-way streets that may contribute to a larger than normal ETA error. The larger than normal ETA error may result in match cancellations. The data-driven model, however, may not include these other features and, as such, these other features may not be considered in the decision when determining if a match should be bailed out or cancelled. In some implementations, a dynamic transportation matching system may create, maintain, and use multiple different data-driven models. For example, because different geographic locations or geographic regions may exhibit different cancellation patterns and/or may have unique street layouts, a different data-driven model may be created for each geographic location in order to improve a location-specific match bail out decision accuracy.

One or more benefits of the use, by a dynamic transportation matching system, of a bail out feature that may identify matches of a transportation requestor with a transportation provider for completion of a transportation request that may be eligible for bail out using a data-driven model may include creating, by the dynamic transportation matching system, the data-driven model based on machine learning, and accessing, by the dynamic transportation matching system, the data-driven model to determine a threshold value for use as a basis for cancelling the match of the transportation requestor with the transportation provider.

Another benefit may include the dynamic transportation matching system determining that at least one factor associated with a cancellation of a match is not related to the progress of a transportation provider towards a pickup location, determining that at least one factor associated with a cancellation of a match is related to a progress of a transportation provider towards a pickup location, and determining the threshold value is based on at least one factor that is related to the progress of the transportation provider towards the pickup location.

Another benefit may include the dynamic transportation matching system creating a plurality of data-driven models based on machine learning, each of the plurality of data-driven models being associated with a respective geographic region, determining that the pickup location is part of a particular geographic region, and accessing the data-driven model associated with the particular geographic region to determine the threshold value.

Another benefit may include the dynamic transportation matching system associating the cancellation of the matching of the transportation requestor to the transportation provider with the transportation provider and not with the transportation requestor, the associating impacting the transportation provider and positively impacting the transportation requestor.

Another benefit may include the dynamic transportation matching system associating the cancellation of the matching of the transportation requestor to the transportation provider with the transportation requestor based, at least in part, on receiving, from the transportation requestor, a request to cancel the matching of the transportation requestor with the transportation provider.

Another benefit may include cancelling the matching of the transportation requestor with the transportation provider based on the dynamic transportation matching system determining that a different transportation provider is available for matching with the transportation requestor, and, subsequent to cancelling the matching of the transportation requestor with the transportation provider, matching the transportation requestor with the different transportation provider in order to complete the transportation request.

Figure 9:
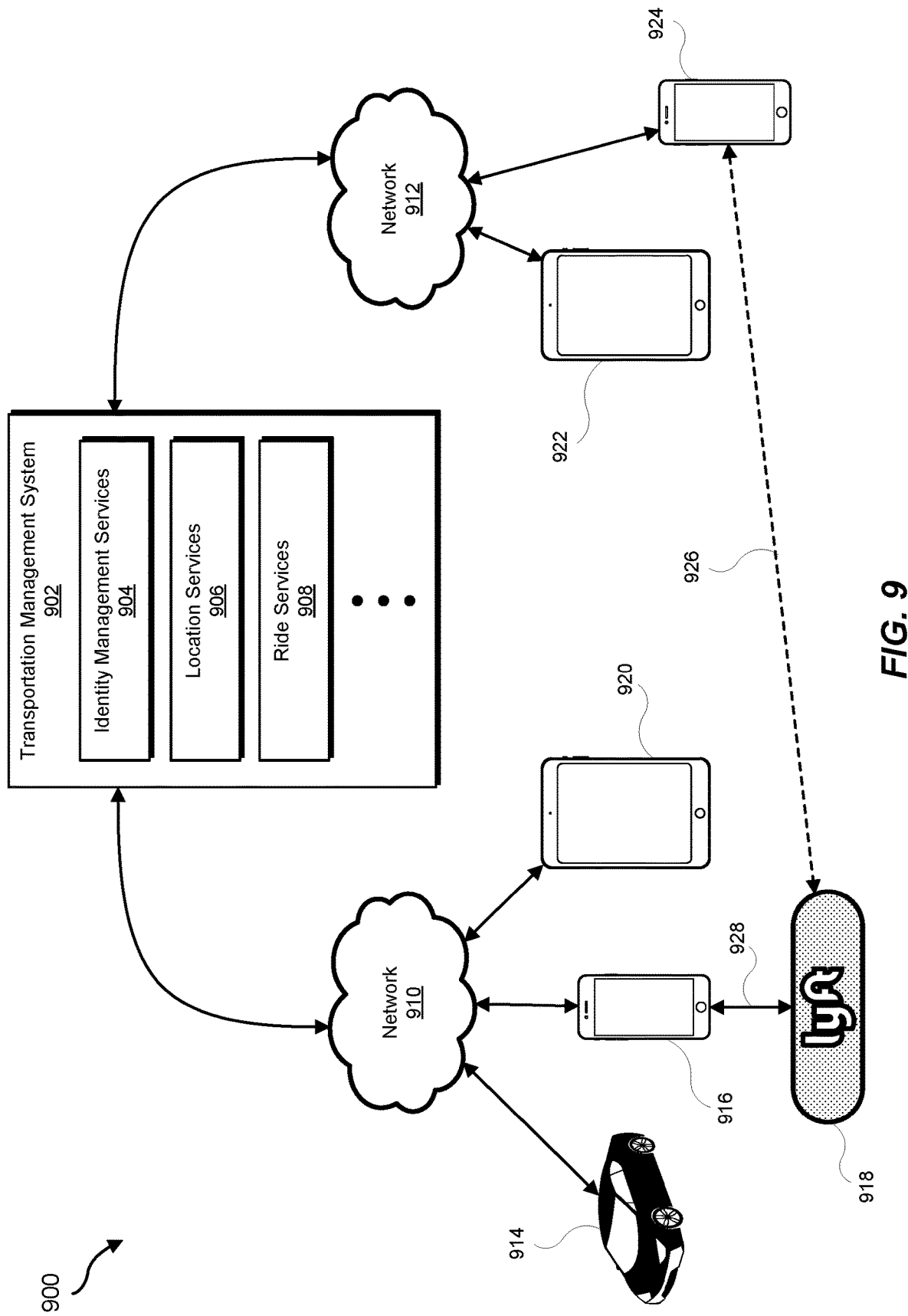
FIG. 9 is an illustration of an example transportation requestor/transportation provider management environment.

FIG. 9 shows a transportation management environment 900, in accordance with various embodiments. As shown in FIG. 9, a transportation management system 902 may run one or more services and/or software applications, including identity management services 904, location services 906, ride services 908, and/or other services. Although FIG. 9 shows a certain number of services provided by transportation management system 902, more or fewer services may be provided in various implementations. In addition, although FIG. 9 shows these services as being provided by transportation management system 902, all or a portion of any of the services may be processed in a distributed fashion. For example, computations associated with a service task may be performed by a combination of transportation management system 902 (including any number of servers, databases, etc.), one or more devices associated with a provider (e.g., devices integrated with managed vehicles 914, provider's computing devices 916 and tablets 920, and transportation management vehicle devices 918), and/or more or more devices associated with a ride requestor (e.g., the requestor's computing devices 924 and tablets 922). In some embodiments, transportation management system 902 may include one or more general purpose computers, server computers, clustered computing systems, cloud-based computing systems, and/or any other computing systems or arrangements of computing systems. Transportation management system 902 may be configured to run any or all of the services and/or software components described herein. In some embodiments, the transportation management system 902 may include an appropriate operating system and/or various server applications, such as web servers capable of handling hypertext transport protocol (HTTP) requests, file transfer protocol (FTP) servers, database servers, etc.

In some embodiments, identity management services 904 may be configured to perform authorization services for requestors and providers and/or manage their interactions and/or data with transportation management system 902. This may include, e.g., authenticating the identity of providers and determining that they are authorized to provide services through transportation management system 902. Similarly, requestors' identities may be authenticated to determine whether they are authorized to receive the requested services through transportation management system 902. Identity management services 904 may also manage and/or control access to provider and/or requestor data maintained by transportation management system 902, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 902 may also manage and/or control access to provider and/or requestor data stored with and/or obtained from third-party systems. For example, a requester or provider may grant transportation management system 902 access to a third-party email, calendar, or task management system (e.g., via the user's credentials). As another example, a requestor or provider may grant, through a mobile device (e.g., 916, 920, 922, or 924), a transportation application associated with transportation management system 902 access to data provided by other applications installed on the mobile device. In some examples, such data may be processed on the client and/or uploaded to transportation management system 902 for processing.

In some embodiments, transportation management system 902 may provide ride services 908, which may include ride matching and/or management services to connect a requestor to a provider. For example, after identity management services module 904 has authenticated the identity a ride requestor, ride services module 908 may attempt to match the requestor with one or more ride providers. In some embodiments, ride services module 908 may identify an appropriate provider using location data obtained from location services module 906. Ride services module 908 may use the location data to identify providers who are geographically close to the requestor (e.g., within a certain threshold distance or travel time) and/or who are otherwise a good match with the requestor. Ride services module 908 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 908 may use rule-based algorithms and/or machine-learning models for matching requestors and providers.

Transportation management system 902 may communicatively connect to various devices through networks 910 and/or 912. Networks 910 and 912 may include any combination of interconnected networks configured to send and/or receive data communications using various communication protocols and transmission technologies. In some embodiments, networks 910 and/or 912 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 910 and/or 912 using a mobile network (such as a mobile telephone network, cellular network, satellite network, or other mobile network), a public switched telephone network (PSTN), wired communication protocols (e.g., Universal Serial Bus (USB), Controller Area Network (MAY)), and/or wireless communication protocols (e.g., wireless LAN (WLAN) technologies implementing the IEEE 802.11 family of standards, Bluetooth, Bluetooth Low Energy, Near Field Communication (NFC), Z-Wave, and ZigBee). In various embodiments, networks 910 and/or 912 may include any combination of networks described herein or any other type of network capable of facilitating communication across networks 910 and/or 912.

In some embodiments, transportation management vehicle device 918 may include a provider communication device configured to communicate with users, such as drivers, passengers, pedestrians, and/or other users. In some embodiments, transportation management vehicle device 918 may communicate directly with transportation management system 902 or through another provider computing device, such as provider computing device 916. In some embodiments, a requestor computing device (e.g., device 924) may communicate via a connection 926 directly with transportation management vehicle device 918 via a communication channel and/or connection, such as a peer-to-peer connection, Bluetooth connection, NFC connection, ad hoc wireless network, and/or any other communication channel or connection. Although FIG. 9 shows particular devices communicating with transportation management system 902 over networks 910 and 912, in various embodiments, transportation management system 902 may expose an interface, such as an application programming interface (API) or service provider interface (SPI) to enable various third parties which may serve as an intermediary between end users and transportation management system 902.

In some embodiments, devices within a vehicle may be interconnected. For example, any combination of the following may be communicatively connected: vehicle 914, provider computing device 916, provider tablet 920, transportation management vehicle device 918, requestor computing device 924, requestor tablet 922, and any other device (e.g., smart watch, smart tags, etc.). For example, transportation management vehicle device 918 may be communicatively connected to provider computing device 916 and/or requestor computing device 924. Transportation management vehicle device 918 may establish communicative connections, such as connections 926 and 928, to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 902 using applications executing on their respective computing devices (e.g., 916, 918, 920, and/or a computing device integrated within vehicle 914), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 914 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 902. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 10:
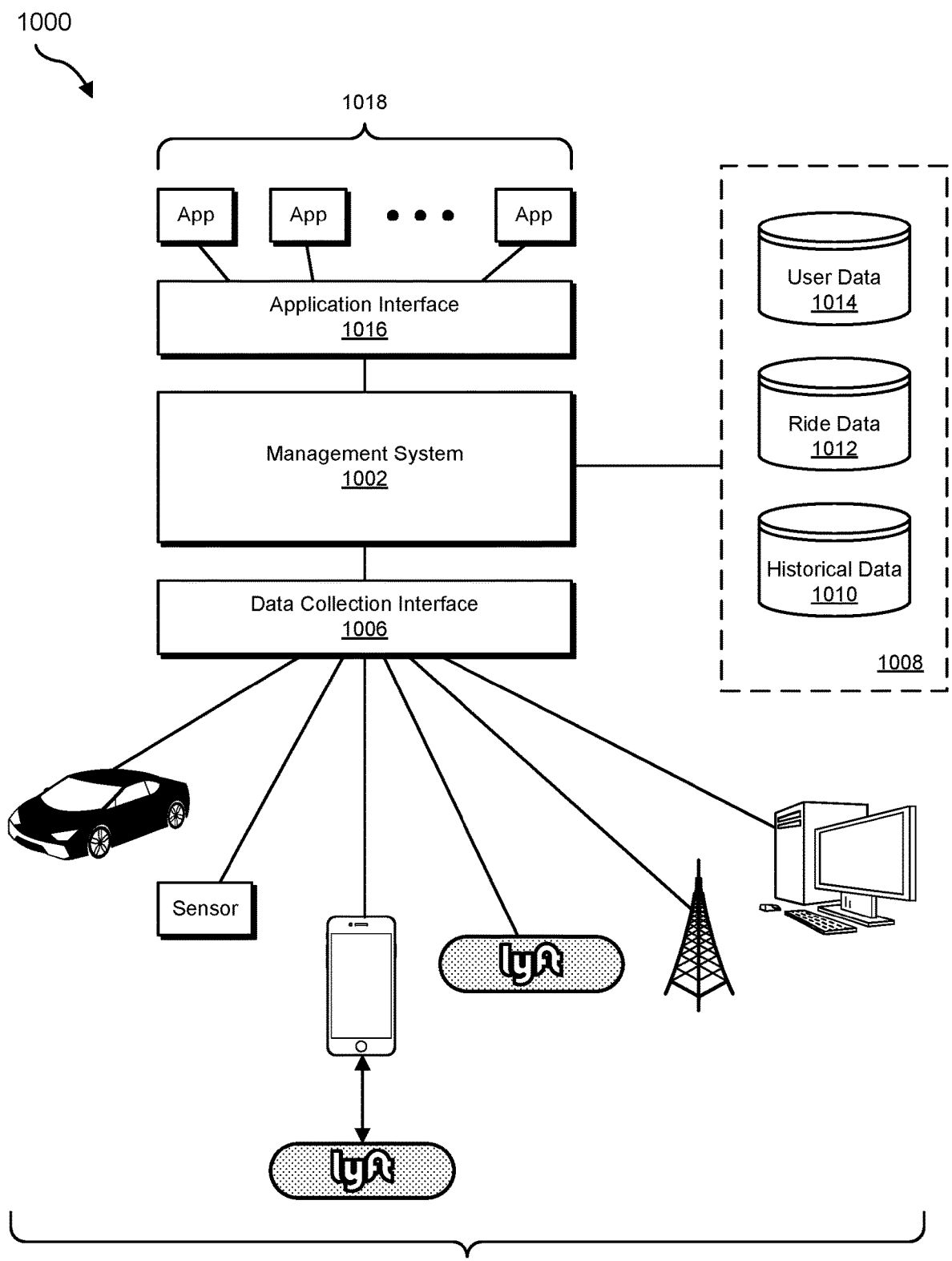
FIG. 10 is an illustration of an example data collection and application management system.

FIG. 10 shows a data collection and application management environment 1000, in accordance with various embodiments. As shown in FIG. 10, management system 1002 may be configured to collect data from various data collection devices 1004 through a data collection interface 1006. As discussed above, management system 1002 may include one or more computers and/or servers or any combination thereof. Data collection devices 1004 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1006 may include, e.g., an extensible device framework configured to support interfaces for each data collection device. In various embodiments, data collection interface 1006 may be extended to support new data collection devices as they are released and/or to update existing interfaces to support changes to existing data collection devices. In various embodiments, data collection devices may communicate with data collection interface 1006 over one or more networks. The networks may include any network or communication protocol as would be recognized by one of ordinary skill in the art, including those networks discussed above.

As shown in FIG. 10, data received from data collection devices 1004 may be stored in data store 1008. Data store 1008 may include one or more data stores, such as databases, object storage systems and services, cloud-based storage services, and other data stores. For example, various data stores may be implemented on a non-transitory storage medium accessible to management system 1002, such as historical data store 1010, ride data store 1012, and user data store 1014. Data stores 1008 may be local to management system 1002, or remote and accessible over a network, such as those networks discussed above or a storage-area network or other networked storage system. In various embodiments, historical data 1010 may include historical traffic data, weather data, request data, road condition data, or any other data for a given region or regions received from various data collection devices. Ride data 1012 may include route data, request data, timing data, and other ride related data, in aggregate and/or by requestor or provider. User data 1014 may include user account data, preferences, location history, and other user-specific data. Although certain data stores are shown by way of example, any data collected and/or stored according to the various embodiments described herein may be stored in data stores 1008.

As shown in FIG. 10, an application interface 1016 may be provided by management system 1002 to enable various apps 1018 to access data and/or services available through management system 1002. Apps 1018 may run on various user devices (including provider and requestor computing devices, such as those discussed above) and/or may include cloud-based or other distributed apps configured to run across various devices (e.g., computers, servers, or combinations thereof). Apps 1018 may include, e.g., aggregation and/or reporting apps which may utilize data 1008 to provide various services (e.g., third-party ride request and management apps). In various embodiments, application interface 1016 may include an API and/or SPI enabling third party development of apps 1018. In some embodiments, application interface 1016 may include a web interface, enabling web-based access to data 1008 and/or services provided by management system 1002. In various embodiments, apps 1018 may run on devices configured to communicate with application interface 1016 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are completed using autonomous vehicles. For example, a transportation management system of a ridesharing service may facilitate the completion of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain implementations one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data regarding cancelled transports to be transformed, transform the cancelled match related data that may include progress information, output a result of the transformation to create one or more data-driven models based on machine learning, use the result of the transformation to identify transports eligible for cancellation, and store the result of the transformation to cancel and rematch a transportation request with a transportation provider. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, by a dynamic transportation matching system from a computing device of a requestor, a request for transportation specifying a pickup location for the requestor;
   matching, by the dynamic transportation matching system, the requestor with a provider for completion of the request;
   sending, by the dynamic transportation matching system to a computing device of the provider, the request for transportation;
   calculating, by the dynamic transportation matching system, an estimated target for arrival of the provider at the pickup location based on an initial location of the provider;
   monitoring, by the dynamic transportation matching system, a progress of the provider towards the pickup location, the monitoring including identifying a subsequent target for arrival of the provider at the pickup location based on a subsequent location of the provider;
   calculating, by the dynamic transportation matching system, a probability of a cancellation of the matching of the requestor with the provider based on the progress of the provider towards the pickup location by:
      determining that the pickup location is part of a geographic cluster;
      generating a data-driven model using machine learning;
      tuning the data-driven model for the geographic cluster; and
      using the data-driven model associated with the geographic cluster to calculate the probability of the cancellation of the matching; and
   cancelling, by the dynamic transportation matching system, the matching of the requestor with the provider based at least in part on:
      accessing the data-driven model associated with the geographic cluster to determine a threshold value for the probability of the cancellation of the matching; and
      comparing the probability of the cancellation of the matching of the requestor with the provider to the threshold value.

2. The method of claim 1, wherein monitoring the progress of the provider towards the pickup location comprises identifying a plurality of subsequent targets for arrival of the provider at the pickup location, each of the plurality of subsequent targets associated with a respective subsequent location of the provider.

3. The method of claim 1, wherein monitoring the progress of the provider towards the pickup location comprises determining that:
   the provider is not moving;
   the provider is moving away from the pickup location; or
   the provider is moving at a slower than predicted rate.

4. The method of claim 1, wherein the probability of the cancellation of the matching of the requestor with the provider comprises a probability that the request for transportation will be cancelled before an arrival of the provider at the pickup location.

5. The method of claim 1,
   wherein calculating the estimated target for arrival of the provider at the pickup location includes calculating an estimated time of arrival (ETA) of the provider at the pickup location;
   wherein identifying the subsequent target for arrival of the provider at the pickup location includes calculating a subsequent ETA of the provider at the pickup location; and
   wherein calculating the probability of the cancellation of the matching of the requestor with the provider includes calculating a difference between the estimated ETA and the subsequent ETA.

6. The method of claim 1, wherein calculating the probability of the cancellation of the matching of the requestor with the provider comprises:
   calculating the probability of the cancellation during a travel time of the provider towards the pickup location; and
   updating the probability of the cancellation at regular intervals during the travel time of the provider.

7. The method of claim 1, wherein calculating the probability of the cancellation of the matching of the requestor with the provider comprises:
generating, by the dynamic transportation matching system, the data-driven model for storage in a model repository; and
calculating the probability of the cancellation by accessing the data-driven model in the model repository.

8. The method of claim 1, wherein cancelling the matching of the requestor with the provider comprises:
comparing the probability of the cancellation of the matching to the threshold value to determine the matching is eligible for cancellation; and
cancelling the matching of the requestor with the provider based on the determination.

9. The method of claim 1, wherein calculating the probability of the cancellation of the matching of the requestor with the provider comprises:
generating, by the dynamic transportation matching system, a plurality of data-driven models based on machine learning, each of the plurality of data-driven models being associated with a respective geographic cluster;
determining, by the dynamic transportation matching system, that the pickup location is part of a particular geographic cluster; and
accessing, by the dynamic transportation matching system, the data-driven model associated with the particular geographic cluster to determine a particular threshold value for the particular geographic cluster.

10. The method of claim 1, wherein cancelling the matching of the requestor with the provider comprises:
determining, based on comparing the probability of the cancellation of the matching to the threshold value, that the request for transportation is eligible for cancellation;
determining that a different provider is available for matching with the requestor; and
cancelling the matching of the requestor with the provider based on the different provider.

11. The method of claim 10, further comprising, subsequent to cancelling the matching of the requestor with the provider, matching the requestor with the different provider in order to complete the request.

12. The method of claim 1, further comprising:
calculating a first probability of the cancellation of the matching of the requestor with the provider based on at least one external factor not related to the progress of the provider towards the pickup location;
calculating a second probability of the cancellation of the matching of the requestor with the provider based on at least one factor related to the progress of the provider towards the pickup location and based on the at least one external factor not related to the progress of the provider towards the pickup location;
calculating a difference between the second probability and the first probability; and
determining that the cancelling of the matching of the requestor with the provider is based on the progress of the provider towards the pickup location based on the difference between the second probability and the first probability.

13. The method of claim 12, further comprising associating, based on determining that the cancelling of the matching of the requestor with the provider is based on the progress of the provider towards the pickup location, the cancelling of the matching of the requestor to the provider with the provider and not with the requestor, the associating impacting at least one performance rating associated with the provider.

14. The method of claim 1, further comprising:
receiving, by the dynamic transportation matching system and from the computing device of the requestor, a request to cancel the matching of the requestor with the provider;
cancelling, by the dynamic transportation matching system, the matching of the requestor with the provider based at least in part on the request; and
associating, by the dynamic transportation matching system, the cancelling of the matching of the requestor to the provider with the requestor instead of with the provider.

15. A system comprising one or more physical processors and one or more memories coupled to one or more of the physical processors, the one or more memories comprising instructions operable when executed by the one or more physical processors to cause the system to perform operations comprising:
receiving, by a dynamic transportation matching system from a computing device of a requestor, a request for transportation specifying a pickup location for the requestor;
matching, by the dynamic transportation matching system, the requestor with a provider for completion of the request;
sending, by the dynamic transportation matching system to a computing device of the provider, the request for transportation;
calculating, by the dynamic transportation matching system, an estimated target for arrival of the provider at the pickup location based on an initial location of the provider;
monitoring, by the dynamic transportation matching system, a progress of the provider towards the pickup location, the monitoring including identifying a subsequent target for arrival of the provider at the pickup location based on a subsequent location of the provider;
calculating, by the dynamic transportation matching system, a probability of a cancellation of the matching of the requestor with the provider based on the progress of the provider towards the pickup location by:
determining that the pickup location is part of a geographic cluster;
generating a data-driven model using machine learning;
tuning the data-driven model for the geographic cluster; and
using the data-driven model associated with the geographic cluster to calculate the probability of the cancellation of the matching; and
cancelling, by the dynamic transportation matching system, the matching of the requestor with the provider based at least in part on:
accessing the data-driven model associated with the geographic cluster to determine a threshold value for the probability of the cancellation of the matching; and
comparing the probability of the cancellation of the matching of the requestor with the provider to the threshold value.

16. The system of claim 15, wherein calculating the probability of the cancellation of the matching of the requestor with the provider comprises:

calculating the probability of the cancellation during a travel time of the provider towards the pickup location; and updating the probability of the cancellation at regular intervals during the travel time of the provider.

17. The system of claim 15, wherein calculating the probability of the cancellation of the matching of the requestor with the provider comprises:

generating, by the dynamic transportation matching system, the data-driven model for storage in a model repository; and calculating the probability of the cancellation by accessing the data-driven model in the model repository.

18. The system of claim 15, wherein cancelling the matching of the requestor with the provider comprises:

comparing the probability of the cancellation of the matching to the threshold value to determine the matching is eligible for cancellation; and cancelling the matching of the requestor with the provider based on the determination.

19. The system of claim 15, wherein the operations further comprise:

calculating a first probability of the cancellation of the matching of the requestor with the provider based on at least one external factor not related to the progress of the provider towards the pickup location;

calculating a second probability of the cancellation of the matching of the requestor with the provider based on at least one factor related to the progress of the provider towards the pickup location and based on the at least one external factor not related to the progress of the provider towards the pickup location;

calculating a difference between the second probability and the first probability; and determining that the cancelling of the matching of the requestor with the provider is based on the progress of the provider towards the pickup location based on the difference between the second probability and the first probability.

20. A non-transitory computer-readable medium comprising computer-readable instructions that, when executed by at least one processor of a computing device, cause the computing device to:

receive, by a dynamic transportation matching system from a computing device of a requestor, a request for transportation specifying a pickup location for the requestor;

match, by the dynamic transportation matching system, the requestor with a provider for completion of the request;

send, by the dynamic transportation matching system to a computing device of the provider, the request for transportation;

calculate, by the dynamic transportation matching system, an estimated target for arrival of the provider at the pickup location based on an initial location of the provider;

monitor, by the dynamic transportation matching system, a progress of the provider towards the pickup location, the monitoring including identifying a subsequent target for arrival of the provider at the pickup location based on a subsequent location of the provider;

calculate, by the dynamic transportation matching system, a probability of a cancellation of the matching of the requestor with the provider based on the progress of the provider towards the pickup location by:

determining that the pickup location is part of a geographic cluster;

generating a data-driven model using machine learning;

tuning the data-driven model for the geographic cluster; and using the data-driven model associated with the geographic cluster to calculate the probability of the cancellation of the matching; and cancel, by the dynamic transportation matching system, the matching of the requestor with the provider based at least in part on:

accessing the data-driven model associated with the geographic cluster to determine a threshold value for the probability of the cancellation of the matching; and comparing the probability of the cancellation of the matching of the requestor with the provider to the threshold value.

* * * * *